(12) United States Patent
Asterjadhi et al.

(10) Patent No.: US 12,363,633 B2
(45) Date of Patent: Jul. 15, 2025

(54) POWER SAVE PROTOCOLS FOR MULTI-LINK DEVICES

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Abdel Karim Ajami, Lakeside, CA (US); Gaurang Naik, San Diego, CA (US); Yanjun Sun, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 18/047,956

(22) Filed: Oct. 19, 2022

(65) Prior Publication Data
US 2024/0137860 A1 Apr. 25, 2024
US 2024/0236844 A9 Jul. 11, 2024

(51) Int. Cl.
*H04W 52/02* (2009.01)
*H04W 88/08* (2009.01)

(52) U.S. Cl.
CPC ........ *H04W 52/0206* (2013.01); *H04W 88/08* (2013.01)

(58) Field of Classification Search
CPC ............................ H04W 52/0206; H04W 88/08
See application file for complete search history.

(56) References Cited

U.S. PATENT DOCUMENTS

| | | | |
|---|---|---|---|
| 2021/0058868 A1 | 2/2021 | Cariou | |
| 2021/0289442 A1* | 9/2021 | Naribole | ........... H04W 52/0209 |
| 2023/0102066 A1* | 3/2023 | Ikeda | .................... H04W 76/15 |
| | | | 455/461 |

OTHER PUBLICATIONS

International Search Report dated Feb. 2, 2024 and Written Opinion from corresponding PCT Application No. PCT/US2023/074471.

(Continued)

*Primary Examiner* — Gbemileke J Onamuti
(74) *Attorney, Agent, or Firm* — ArentFox Schiff LLP

(57) ABSTRACT

This disclosure provides methods and devices for introducing a power save protocol (for example, a lower power mode) for a multi-link devices (MLDs). Some aspects more specifically relate to reducing power consumption in an access point (AP) MLD, and more particularly, to a power save protocol (or a lower power mode) for an AP MLD. In some aspects, an AP MLD may initiate a lower power mode to save power for as long as possible while still maintaining minimal receive (RX) and transmit (TX) functionality. When requested by an associated station (STA), the AP MLD may then transition from the lower power mode to a higher power mode with full RX and TX functionality with a minimal delay. The described techniques may also account for trade-offs and constraints which arise due to different use cases and scenarios as well as different device configurations.

30 Claims, 14 Drawing Sheets

(56) References Cited

OTHER PUBLICATIONS

Guogang Huang (Huawei): "CR for Power Save of NSTR Mobile AP MLD", IEEE Draft; 11-22-0356-07-00BE-CR-For-Power-Save-Of-NSTR-Mobile-AP-MLD, IEEE-SA Mentor, Piscataway, NJ USA, vol. 802.11 EHT; 802.llbe, No. 7, Apr. 14, 2022 (Apr. 14, 2022), pp. 1-12, XP068190100, Retrieved from the Internet.
Item 2 Continued: URL:https://mentor.ieee.org/802.11/dcn/22/11-22-0356-07-00be-cr-for-power-save-of-nstr-mobile-ap-m1d.docx [retrieved on Apr. 14, 2022].

\* cited by examiner

POWER SAVE PROTOCOLS FOR MULTI-LINK DEVICES

TECHNICAL FIELD

This disclosure relates generally to wireless communication, and more specifically, to minimizing power consumption for multi-link devices.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Generally, APs have been expected to stay in an active mode and often operate at maximum bandwidth (BW) and a maximum number of spatial streams (NSS) for a given set of channel conditions so that associated STAs may get the highest throughput and fastest service possible. In addition, the power consumption of an AP has not been considered an issue because most APs are continuously connected to power, such as through a wall outlet. However, the amount of power consumed by APs is significant and adds to the maintenance cost and ecological footprint of a network. The power consumption issue is further compounded for multi-AP networks and for APs that support multi-link operation because power consumption increases linearly with the number of APs and links.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. In some implementations, the wireless communication device may include at least one memory; and at least one processor communicatively coupled with the at least one memory, the at least one processor operable to cause the wireless communication device to: transmit, to a wireless access point (AP) multi-link device (MLD) having an AP operating in a lower power mode in which a link associated with the AP is disabled for the wireless station (STA), a request for the AP to transition from operating in the lower power mode to operating in a higher power mode in which the link associated with the AP is enabled for the wireless STA; receive a response associated with the request after a transition delay period; and transmit data to the AP MLD on the link associated with the AP after the transition delay period.

Another innovative aspect of the subject matter described in this disclosure can be implemented in a method of wireless communication. The method may be performed by a STA, and may include transmitting, to a wireless AP MLD having an AP operating in a lower power mode in which a link associated with the AP is disabled for the wireless STA, a request for the AP to transition from operating in the lower power mode to operating in a higher power mode in which the link associated with the AP is enabled for the wireless STA; receiving a response associated with the request after a transition delay period; and transmitting data to the AP MLD on the link associated with the AP after the transition delay period.

Another innovative aspect of the subject matter described in this disclosure can be implemented in a wireless AP. In some implementations, the wireless AP includes at least one memory; at least one processor communicatively coupled with the at least one memory, the at least one processor operable to cause the wireless AP to: receive, from a wireless STA, a request for a wireless AP of the AP MLD to transition from operating in a lower power mode, in which a link associated with the wireless AP is disabled for the wireless STA, to operating in a higher power mode in which the link associated with the wireless AP is enabled for the wireless STA; transmit a response associated with the request after a transition delay period; and receive data from the wireless STA on the link associated with the wireless AP when the link is enabled after the transition delay period.

Another innovative aspect of the subject matter described in this disclosure can be implemented in a method of wireless communication. The method may be performed by a wireless AP and may include receiving, from a wireless STA, a request for a wireless AP of the AP MLD to transition from operating in a lower power mode, in which a link associated with the wireless AP is disabled for the wireless STA, to operating in a higher power mode in which the link associated with the wireless AP is enabled for the wireless STA; transmitting a response associated with the request after a transition delay period; and receiving data from the wireless STA on the link associated with the wireless AP when the link is enabled after the transition delay period.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
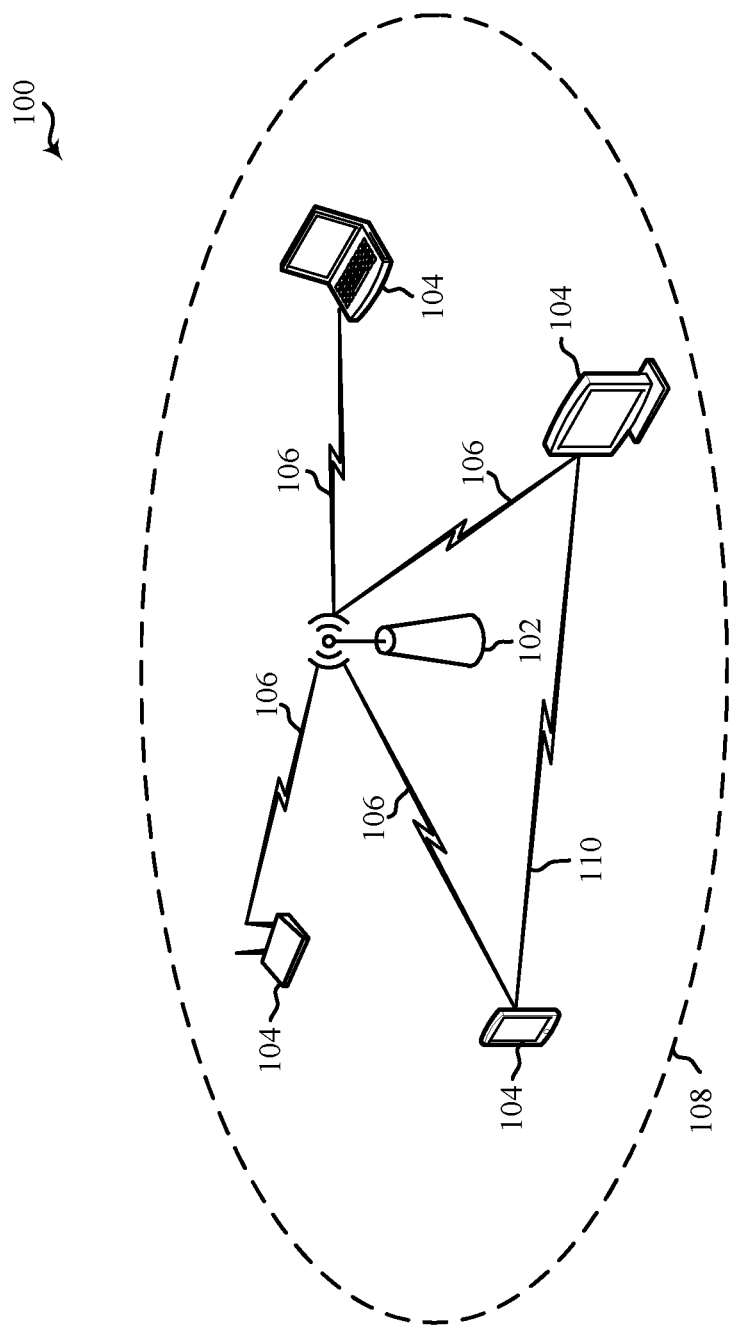
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to reducing power consumption in multi-link device (MLD), and more particularly, to a power save protocol (associated with a "lower power mode") for an access point (AP) MLD. In some aspects, in the lower power mode, the AP MLD may conserve power on a subset of links by reducing a number of active links while leaving an "anchor link" for non-AP stations (STAs). While the subset of links are disabled, the AP MLD may rely on the anchor link for non-AP STAs to perform basic functionalities on and the APs operating on the subset of disabled links save power due to being disabled. In some aspects, an AP MLD may also initiate the lower power mode to save power for as long as possible while still maintaining minimal receive (RX) and transmit (TX) functionality. When requested by an associated STA, the AP MLD may then transition from the lower power mode to a higher power mode with full RX and TX functionality with a minimal delay. In addition, the STA may explicitly request the AP MLD to wake up and to request to increase a time duration that the AP MLD may remain in the awake state on a link associated with the AP MLD, increase a bandwidth on the link, or increase a number of spatial streams (NSS) configured for the link. For example, in instances in which the AP MLD includes an AP operating in a lower power mode (in which a link associated with the AP is disabled for the STA), the STA may transmit an explicit request for the AP MLD to transition from the lower power mode to a higher power mode in which the formerly-disabled link associated with the AP is now enabled for the STA. The described techniques may also account for trade-offs and constraints which arise due to different use cases and scenarios as well as different device configurations.

Particular implementations of the subject matter described in this disclosure can be implemented to realize one or more of the following potential advantages. In some aspects, the described techniques can be used by an AP MLD to enter and remain in a lower power mode so as to operate with minimal RX and TX functionality to minimize power consumption while ensuring that associated STAs continue to be serviced without service disruptions. In addition, the amount of power consumed by APs is significant and is even more pronounced in multi-link and multi-AP networks because power consumption increases linearly with the number of links and number of APs in a same network. This allows the AP to remain in the lower power mode for as long as possible by only entering the higher power mode with full RX/TX capabilities when needed.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an AP 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESSa) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some aspects of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
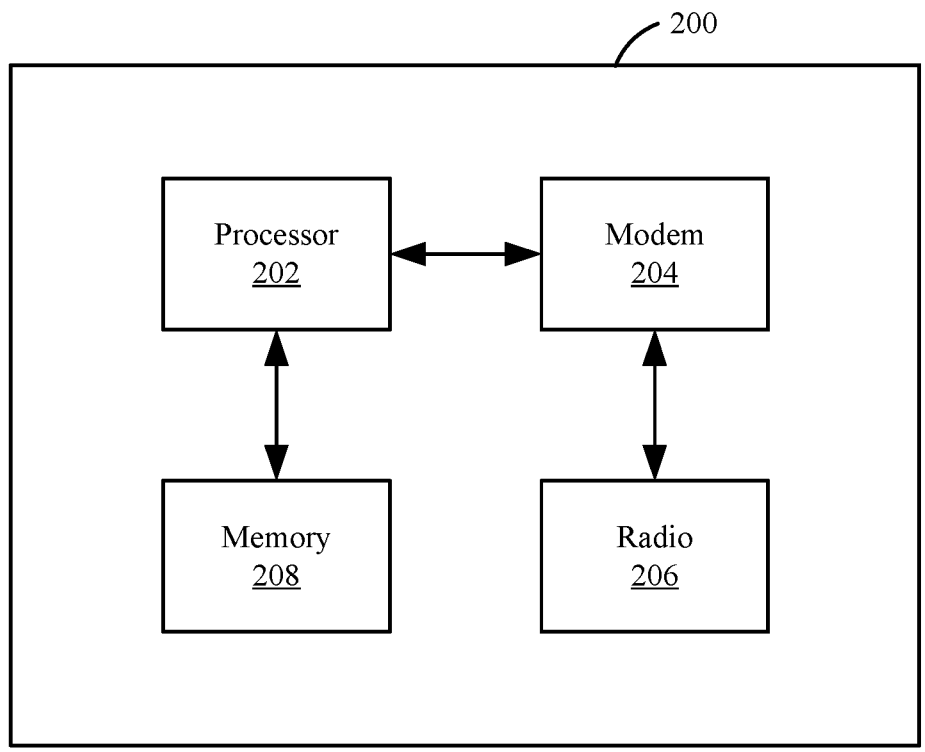
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described with reference to FIG. 1. In some implementations, the wireless communication device 200 can be an example of a device for use in an AP such as the AP 102 described with reference to FIG. 1. The wireless communication device 200 is capable of transmitting (or outputting for transmission) and receiving wireless communications (for example, in the form of wireless packets). For example, the wireless communication device 200 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 200 can be, or can include, a chip, system on chip (SoC), chipset, package or device that includes one or more modems 204, for example, a Wi-Fi (IEEE 802.11 compliant) modem. In some implementations, the one or more modems 204 (collectively "the modem 204") additionally include a WWAN modem (for example, a 3GPP 4G LTE or 5G compliant modem). In some implementations, the wireless communication device 200 also includes one or more radios 206 (collectively "the radio 206"). In some implementations, the wireless communication device 200 further includes one or more processors, processing blocks or processing elements 202 (collectively "the processor 202") and one or more memory blocks or elements 208 (collectively "the memory 208").

The modem 204 can include an intelligent hardware block or device such as, for example, an application-specific integrated circuit (ASIC) among other possibilities. The modem 204 is generally configured to implement a PHY layer. For example, the modem 204 is configured to modulate packets and to output the modulated packets to the radio 206 for transmission over the wireless medium. The modem 204 is similarly configured to obtain modulated packets received by the radio 206 and to demodulate the packets to provide demodulated packets. In addition to a modulator and a demodulator, the modem 204 may further include digital signal processing (DSP) circuitry, automatic gain control (AGC), a coder, a decoder, a multiplexer and a demultiplexer. For example, while in a transmission mode, data obtained from the processor 202 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 206. In implementations involving beamforming, the modulated symbols in the respective spatial streams are precoded via a steering matrix prior to their provision to the IFFT block.

While in a reception mode, digital signals received from the radio 206 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 202) for processing, evaluation or interpretation.

The radio 206 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 204 are provided to the radio 206, which then transmits the symbols via the coupled antennas. Similarly, symbols received via the antennas are obtained by the radio 206, which then provides the symbols to the modem 204.

The processor 202 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 202 processes information received through the radio 206 and the modem 204, and processes information to be output through the modem 204 and the radio 206 for transmission through the wireless medium. For example, the processor 202 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 202 may generally control the modem 204 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 202, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
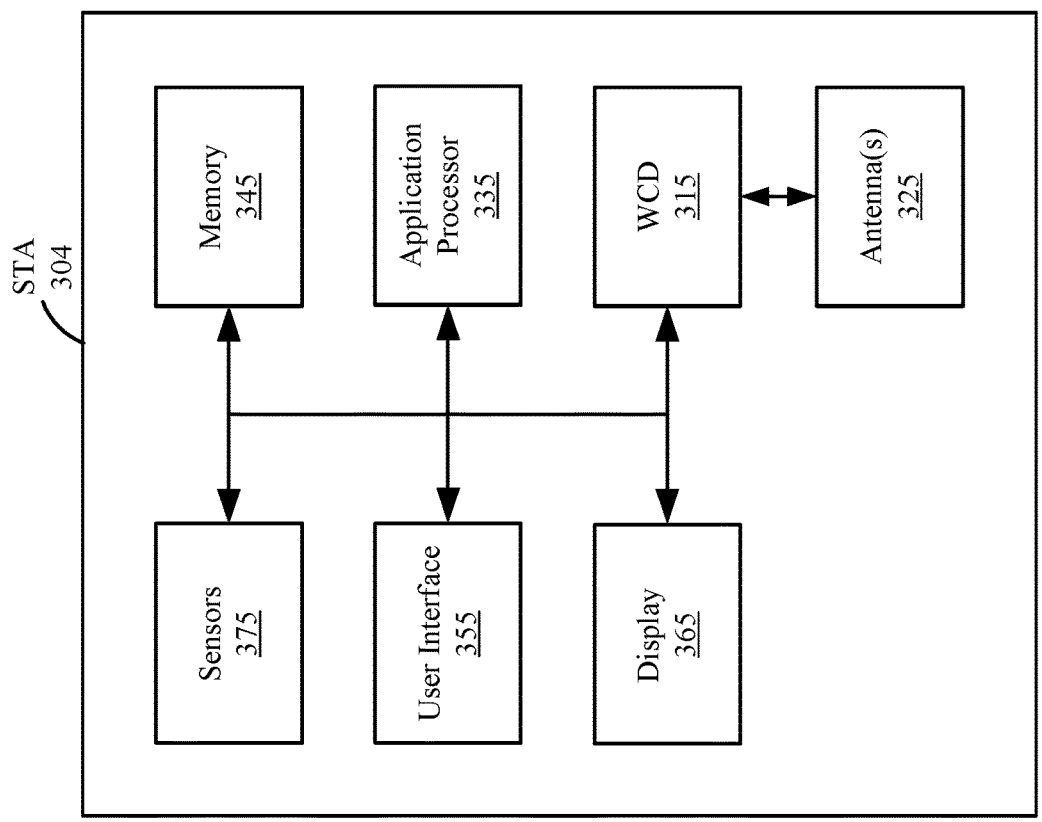
FIG. 3B shows a block diagram of an example station (STA).
Figure 3A:
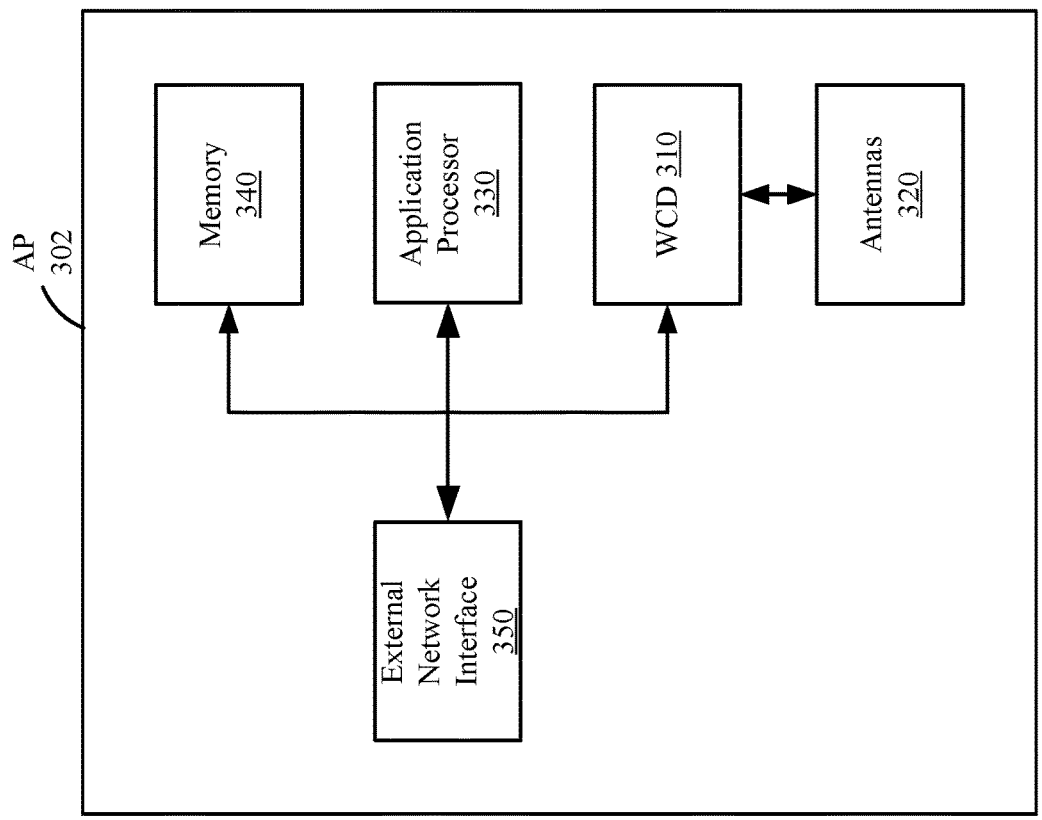
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 400 described with reference to FIG. 4. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Various aspects described herein relate generally to reducing power consumption in an AP, and more particularly, to introducing a power save protocol (for example, lower power mode) for an AP. In some aspects, an AP may initiate a low power mode for reducing power consumption while still maintaining minimal receive (RX) and transmit (TX) functionality. A wireless STA may then request for the AP to transition from the lower power mode to a higher power mode in which the link associated with the AP is enabled for the wireless STA with a minimal delay.

Figure 4:
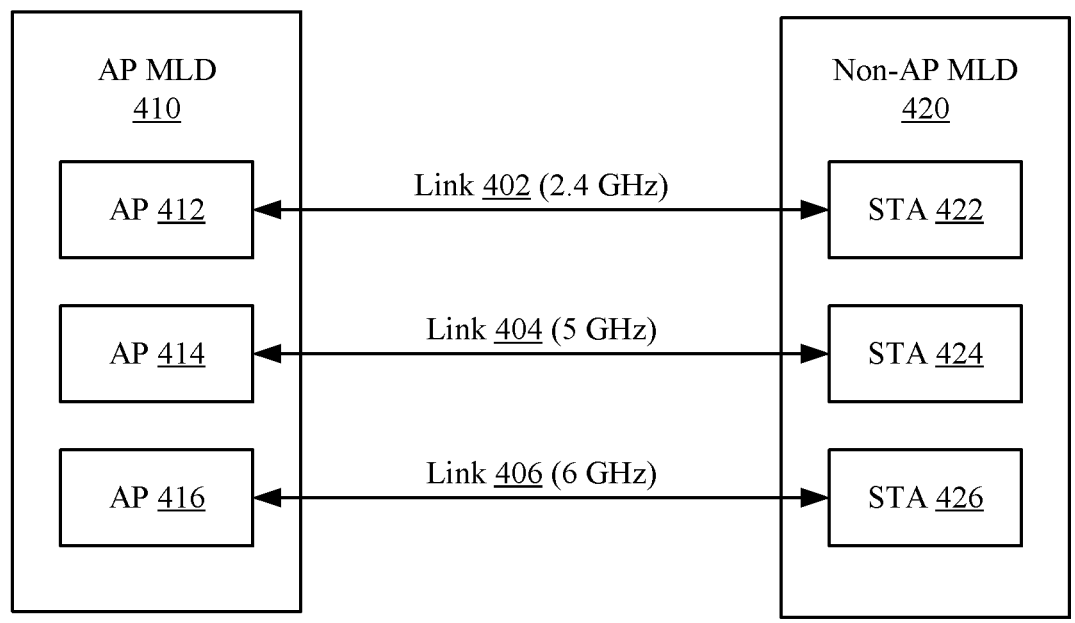
FIG. 4 shows an example wireless communication system that includes an AP multi-link device (MLD) and a non-AP MLD.

FIG. 4 shows an example communication system 400 that includes an AP MLD 410 and a non-AP MLD 420. In some implementations, the AP MLD 410 may be one example of the AP 102 of FIG. 1 or the AP 302 of FIG. 3A. In some implementations, the non-AP MLD 420 may be one example of any of the STAs 104 of FIG. 1 or the STA 304 of FIG. 3B.

The AP MLD 410 includes multiple APs 412, 414, and 416 associated with (or operating on) communication links 402, 404, and 406 respectively. In the example of FIG. 4, the AP MLD 410 is shown to include three APs. However, in some implementations, the AP MLD 410 may include fewer or more APs than those depicted in FIG. 4. In some aspects, the APs 412, 414, and 416 may share a common association context (through the AP MLD 410). The APs 412, 414, and 416 also may establish their respective communication links 402, 404, and 406 on different frequency bands. In some implementations, one or more of the APs 412, 414, and 416 may operate at a carrier frequency below 7 GHz (such as in any of the 2.4 GHz, 5 GHz, or 6 GHz frequency bands). For example, in the illustrated aspect, the AP 412 may operate at a carrier frequency in the 2.4 GHz band, the AP 414 may operate at a carrier frequency in the 5 GHz band, and the AP 416 may operate at a carrier frequency of 6 GHz. In some other implementations, one or more of the APs 412, 414, and 416 may operate at a carrier frequency above 7 GHz (such as in the 60 GHz or 45 GHz frequency bands).

The non-AP MLD 420 includes multiple STAs 422, 424, and 426 that may be configured to communicate on the communication links 402, 404, and 406, respectively. In some implementations, one or more of the STAs 422, 424, and 426 may operate at a carrier frequency below 7 GHz (such as in any of the 2.4 GHz, 5 GHz, or 6 GHz frequency bands). For example, in the illustrated aspect, the STA 422 may operate at a carrier frequency in the 2.4 GHz band, the STA 424 may operate at a carrier frequency in the 5 GHz band, and the STA 426 may operate at a carrier frequency of 6 GHz. In some other implementations, one or more of the STAs 422, 424, and 426 may operate at a carrier frequency above 7 GHz (such as in the 60 GHz or 45 GHz frequency bands). In the example of FIG. 4, the non-AP MLD 420 is shown to include three STAs. However, in some implementations, the non-AP MLD 420 may include fewer or more STAs than those depicted in FIG. 4. Existing versions of the IEEE 802.11 standard define several modes in which a non-AP MLD may operate. The various operating modes depend on the number of wireless radios associated with the non-AP MLD and the ability of the non-AP MLD to communicate (such as by transmitting or receiving) concurrently on multiple communication links.

In some implementations, the non-AP MLD 420 may include a single radio or may otherwise be capable of communicating on only one link at a time. In such implementations, the non-AP MLD 420 may operate in a multi-link single-radio (MLSR) mode or an enhanced MLSR (eMLSR) mode. A non-AP MLD operating in the eMLSR mode can concurrently listen on multiple links for specific types of packets, such as buffer status report poll (BSRP) frames or multi-user (MU) request-to-send (RTS) (MU-RTS); however, a non-AP MLD operating in the eMLSR mode can only transmit or receive on one of the links at any given time. For example, the STAs 422, 424, and 426 may concurrently listen on their respective links 402, 404, and 406 during a listen interval. However, if any of the STAs 422, 424, or 426 detects a BSRP frame on its respective link, the non-AP MLD 420 subsequently tunes all of its antennas to the link on which the BSRP frame is detected. By contrast, a non-AP MLD operating in the MLSR mode can only listen to, and transmit or receive on, one communication link at any given time. For example, two of the STAs 422, 424, or 426 be in a power save mode any time one of the STAs 422, 424, or 426 is active.

In some other implementations, the non-AP MLD 420 may include multiple radios and may be capable of concurrent communications on each of the links 402, 404, and 406. In such implementations, the non-AP MLD 420 may operate in a multi-link multi-radio (MLMR) simultaneous transmit and receive (STR) mode or a multi-link multi-radio non-STR (NSTR) mode. A non-AP MLD operating in the MLMR STR mode can simultaneously transmit and receive on multiple links. For example, the STA 422 may transmit or receive on the link 402 while the STA 424 concurrently transmits or receives on the link 404. More specifically, such communications may be asynchronous. In other words, the STA 422 can be transmitting on the link 402 while the STA 424 is receiving on the link 404. By contrast, a non-AP MLD operating in the MLMR NSTR mode can simultaneously transmit and receive on multiple links only if such communications are synchronous. For example, the STAs 422, 424, and 426 may concurrently transmit on the links 402, 404, and 406 and also may concurrently receive on the links 402, 404, and 406. However, the STA 422 cannot be transmitting on the link 402 while the STA 424 is receiving on the link 404.

Still further, in some implementations, a non-AP MLD may include multiple radios but may be capable of concurrent communications on only a subset of the links. In such implementations, the non-AP MLD 420 may operate in an enhanced MLMR (eMLMR) mode or a hybrid eMLSR mode. A non-AP MLD operating in the eMLMR mode supports MLMR STR operation only between some pairs of links. For example, the STAs 422 and 424 may concurrently communicate on their respective links 402 and 404 in accordance with the MLMR STR mode of operation, whereas the STA 426 may not concurrently transmit or receive on its respective link 406 (referred to herein as an "eMLMR link"). In aspects in which the non-AP MLD 420 includes four or more STAs, the STAs associated with the eMLMR links, such as the STA 426 and another similar STA, may "pool" their antennas so that each of the STAs can utilize the antennas of other STAs when transmitting or receiving on one of the eMLMR links. On the other hand, a non-AP MLD operating in the hybrid eMLSR mode supports MLMR STR operation between some pairs of links and eMLSR operation between some other pairs of links.

Figure 5:
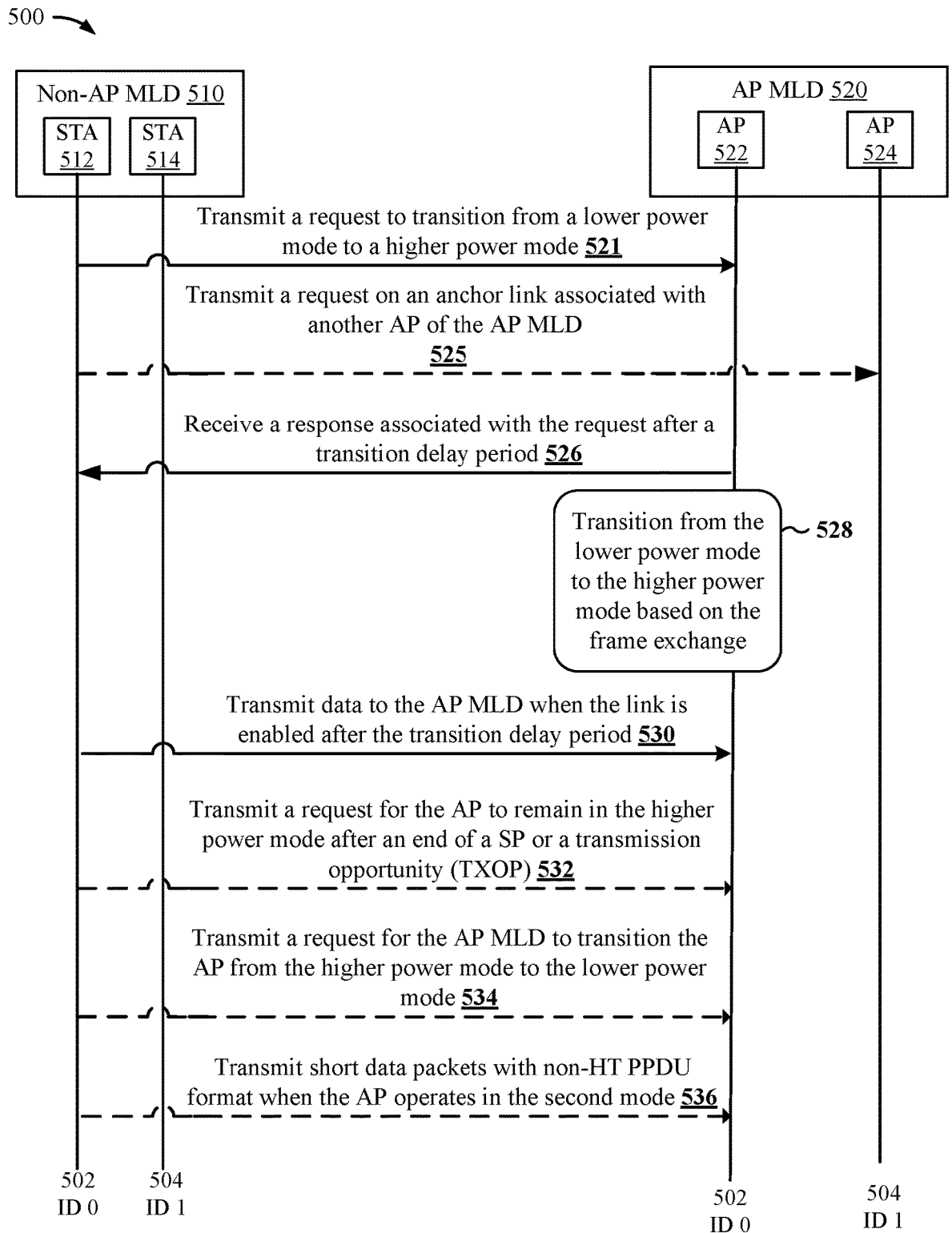
FIG. 5 shows a sequence diagram depicting an example of wireless communication between a non-AP MLD and an AP MLD according to a power save protocol.

In some aspects, the AP MLD 410 and the non-AP MLD 420 may communicate cross-link MLS control signaling over one or more of the links 402, 404, and 406. For example, the AP MLD 410 and the non-AP MLD 420 may communicate MLS control signaling that is applicable to two of the links 402 and 404 on another link 406. In some implementations, the MLS control signaling may include a configuration that is common to all of the links indicated in a MAC header. For example, the AP MLD 410 or the non-AP MLD 420 may transmit a frame having a MAC header that includes a field (or subfield) configured with one value that is universally applicable to each of the links identified in a link ID bitmap included in the MAC header. In some other implementations, the MLS control signaling may individually configure communication on the links indicated in a MAC header. For example, the AP MLD 410 or the non-AP MLD 420 may transmit a frame having a MAC header that indicates communication on each of the links should be configured according to a respective value that is individually applicable to each of the links identified in a link ID bitmap included in the MAC header. In some aspects, each of the respective values may be carried in another MAC header of another frame, such as a respective frame most recently received on each of the identified links. Thus, the concepts and various aspects described herein enable a broad range of flexible and extensible options without contributing additional overhead in terms of frame or header size FIG. 5 shows a sequence diagram depicting an example of wireless communication between a non-AP MLD and an AP MLD according to a power save protocol. The non-AP MLD 510 may include multiple STAs 512, and 514, each of which may be configured to communicate with a respective one of the APs 522, and 524 of the AP MLD 520 over a respective one of the links 502, and 504.

A process flow 500 illustrates an example sequence of operations performed between the STA 512 and the AP 522 to support a power save protocol for the AP 522. For example, process flow 500 depicts operations for switching between a lower power mode and a higher power mode for the AP 522 One or more of the operations described in process flow 500 may be performed earlier or later in the process, omitted, replaced, supplemented, or combined with another operation. Also, additional operations described herein that are not included in process flow 500 may be included in process flow 500.

In some implementations, the AP MLD 520 may be one example of the AP 102 of FIG. 1 or the AP 302 of FIG. 3A. In some other implementations, the AP MLD 510 may be one example of the AP MLD 410 of FIG. 4, and accordingly, the APs 522, and 524 may be examples of the APs 412, and 414, respectively. In some implementations, the non-AP MLD 520 may be one example of any of the STAs 104 of FIG. 1 or the STA 304 of FIG. 3B. In some other implementations, the non-AP MLD 520 may be one example of the non-AP MLD 420 of FIG. 4, and accordingly, the STAs 422, and 424 may be examples of the 512, and 514, respectively.

At 521, an STA 512 of the non-AP MLD 510 may transmit a request to transition from a lower power mode (for example, "light sleep" (LS) mode) to a higher power mode (for example, "active" mode) to an AP 522 of the AP MLD 520. For example, the STA 512 may send a request to send (RTS) that is individually addressed to the AP 522 in non-HT PPDU at 24 MB per second. In an aspect, the lower power mode corresponds to a mode where the AP may maintain minimal RX/TX functionality with the following two modes: Mode 1 (or LS-RX) where the AP is capable of minimal RX functionality and no TX functionality or Mode 2 (or LS-RXTX) where the AP has minimal RX/TX functionality. In some examples, the minimal RX and minimal RX/TX functionality may include receiving data in a non-HT PPDU format, mandatory MCSs, 20 MHz bandwidth, etc.) In an aspect, the lower power mode may be equivalent to a doze state where the AP has no RX/TX functionality. In an aspect the higher power mode corresponds to a mode with normal RX/TX functionality.

Optionally, at 525, the STA 512 may transmit a request on an anchor link 502 associated with another AP 524 of the AP MLD 520. The anchor link may be enabled when the request is transmitted. The AP may save power on a subset of links while leaving only one link (for example, anchor link) in the higher power mode. The APs operating on the subset of links can save power because they are disabled and are using target weight time (TWT)-based AP PS. In addition, the AP in the higher power mode may advertise that the other links are saving power by advertising a status of each link where the current link is indicated as active and the others are in a power save mode or disabled.

In some aspects, non-AP STAs 512 and 514 may perform all basic functionalities in an anchor link 504 and suspend their operations on disabled links, in which case these APs will save the most power. However, during the time these links are disabled, all of the MLD AP's burdens will fall on the anchor link. The transition from disabled to enabled may also take multiple beacon intervals and the STAs may need to renegotiate some link specific procedures (for example, TWT agreements) after enablement. All of this together may lead to increased delays and slow reactiveness to the traffic changes. In addition, the non-AP STAs 512 and 514 may also operate with an AP in TWT-based PS mode only during TWT SPs in which case these APs will save less power. However, the STAs operating in these links are still served, which avoids any increased delays while also reacting proactively to traffic changes.

A multi-link environment may also enable additional functionalities for ultra high reliability (UHR). If the non-AP MLD 510 intends to send frames on links that are advertised as disabled/TWT PS mode, then the STA can request the AP MLD 520 to enable or awake whichever link it intends to use. This enablement may be done via Link Recognition Frames. The request to transition to a higher power mode can also be achieved via action frames (for example, EML OMN) or A-Control which may include a list of the links being requested to transition to the higher power mode, provide flexibility on which and how many links to transition to the higher power mode, and may include the requested bandwidths, NSSs, and duration of TWT SPs. In an aspect, the AP MLD 520 may confirm which links are being enabled or transitioned to a higher power mode by sending a corresponding response, which may also indicate the confirmed resources (for example, BW/NSS and TWT SP).

At 526, the AP 522 may transmit a response associated with the request after a transition delay period. For example, the AP 522 may respond with a CTS frame to the STA 512. The transition delay period may have a minimal delay that is in the order of microseconds. In cases where the AP is transitioning from a doze state to the higher power state, the transition delay period may have a delay in the order of milliseconds.

At 528, the AP 522 may transition from operating in the lower power mode to operating in the higher power mode based on the frame exchange (for example, RTS/CTS exchange). In order to save power for as long as possible, the AP 522 will transition to the higher power mode only when requested by the STA 512. For instance, in response to a specific PPDU that satisfies a limited RX and TX criteria of the AP 522 in a lower power mode, the AP 522 turns on a full or subset of modules at the AP 522 (for example, high bandwidth, higher MCS constellations, etc.) depending on whether the AP 522 is in the first mode or second mode of the reduced power state. In other words, the AP 522 transitions into the higher power mode because the AP 522 expects to receive data from the STA 512 in full bandwidth.

Optionally, at 530, the AP 522 may transmit data to the AP MLD 520 when the link is enabled after the transition delay period. In other words, the AP 522 now has full RX/TX capabilities.

Optionally, at 532, the STA 512 may transmit a request for the AP to remain in the higher power mode after an end of a SP of the higher power mode or a TXOP. For instance, the STA 512 transmits data in the second power state to the AP 522. In an aspect, either a TXOP ends or, at 534, the STA 512 may transmit a request for the AP MLD 520 to transition the AP 522 from the higher power mode to the lower power mode. TXOP is available in a QoS mode as part of EDCA (Enhanced Distributed Channel Access) and is a limited time period of contention-free channel access available to the channel-owning station. During such a period, the STA 512 can send multiple frames that belong to a particular access category. As another example, the STA 512 may indicate in a last frame that the STA 512 does not have any more data to transmit to the AP 522. In response, the AP 522 may re-enter the lower power mode.

Optionally, at 536, the STA 512 may transmit short data packets with non-HT PPDU format when the AP is operating in the lower power mode.

In this way, the reduced power mode may allow an AP to minimize power consumption while ensuring that associated STAs continue to be served without service disruptions. As a result, the AP may initiate the reduced power mode to turn off at least some of its modules while maintaining minimal RX and TX functionality. The AP may then transition back into a normal power mode when explicitly requested by the STA. This allows the AP to remain in the reduced power mode for as long as possible by only entering into the normal power mode when needed.

Figure 6:
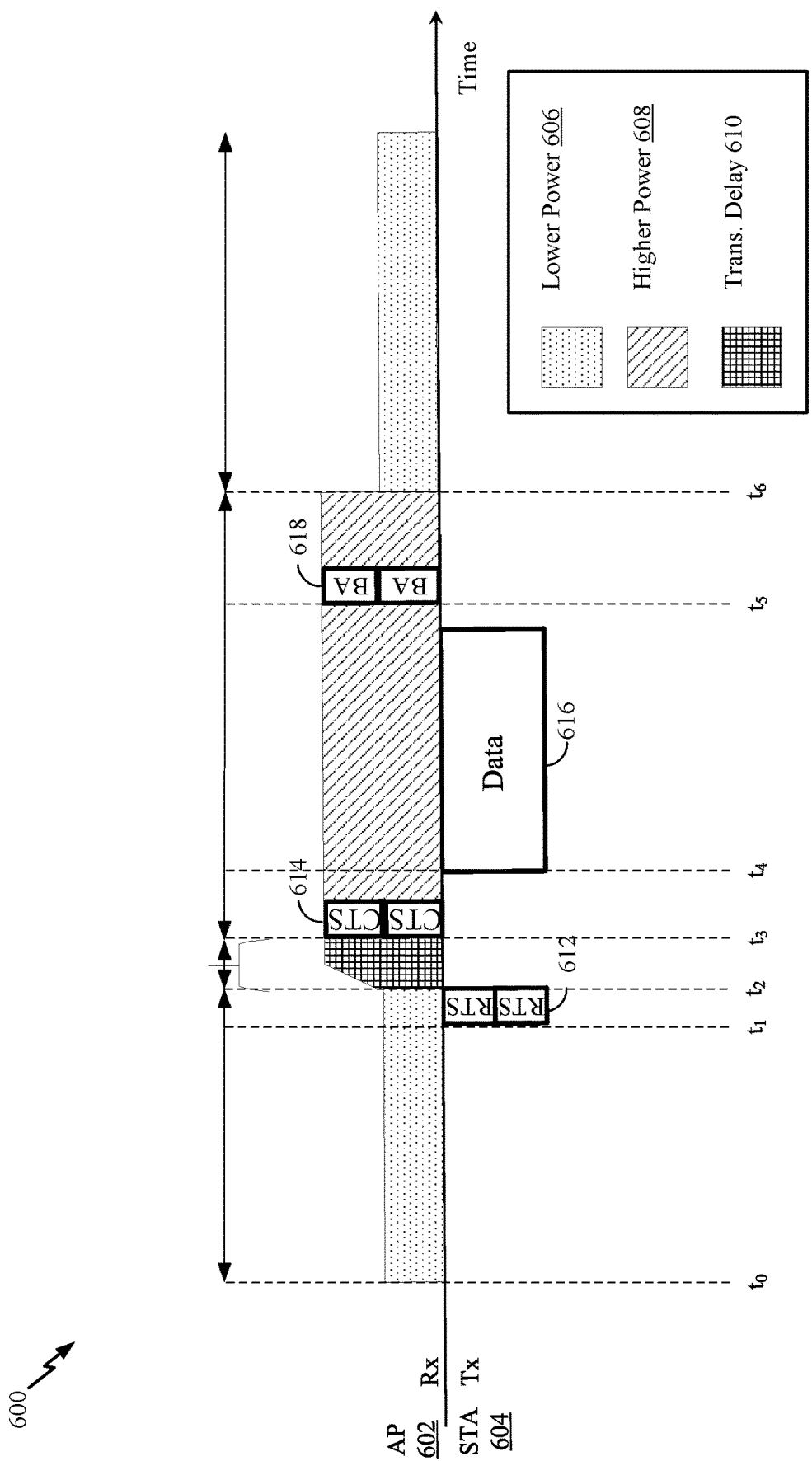
FIG. 6 shows a timing diagram depicting an example of wireless communication between a non-AP MLD and an AP MLD according to a power save protocol.

FIG. 6 shows a timing diagram depicting an example of wireless communication between a non-AP MLD and an AP MLD according to a power save protocol. In some implementations, the AP 602 may be one example of the AP 102 of FIG. 1, the AP 302 of FIG. 3A, APs 412, 414, and 416 of FIG. 4, or the AP 522, and 524 of FIG. 5. In some implementations, the STA 604 may be one example of any of the STAs 104 of FIG. 1, the STA 304 of FIG. 3B, the STA 422, 424, and 426 of FIG. 4, or STA 512, and 514 of FIG. 5.

Timing diagram 600 depicts details of a dynamic AP PS mode when the AP 602 is operating in a lower power mode (or "light sleep" mode) according to a first mode LS-RX. At time period $t_0$, the AP 602 may be in a lower power mode 606. After time period $t_3$, the AP 602 enters the higher power mode (or "active" mode) short inter frame space (SIFS) after receiving the soliciting non-HT PPDU. The soliciting PPDU may be any non-HT (dup) PPDU that solicits an ACK/BA/CTS frame. For instance, the STA 604 may be any individually addressed PPDU sent to the AP 602 which satisfies the constraints of the AP 602 in the lower power mode. At time period $t_1$, the STA 604 transmits RTS frames 612 to the AP 602. At $t_2$, the transition delay 610 begins. After time period $t_3$, the AP 602 transmits a CTS frames 614 to the STA 604 after a transition delay 610. The STA 604 may now transmit data 616 to the AP 602 on a link associated with the AP 602 in the higher power mode (or "active" mode) 608.

In order for the AP 602 to guarantee active scanning to all stations 604, all of the stations 604 will initiate an active scanning procedure by sending a probe request frame in non-HT PPDU format only. The AP 602 may also respond to received probe requests after a particular period. There is native support in most settings because data 616 is already expected to be in non-HT PPDU format and in 20 MHz. The AP 602 may be capable to respond immediately to all received non-HT PPDUs soliciting a response by transitioning to the higher power mode 608.

Figure 7:
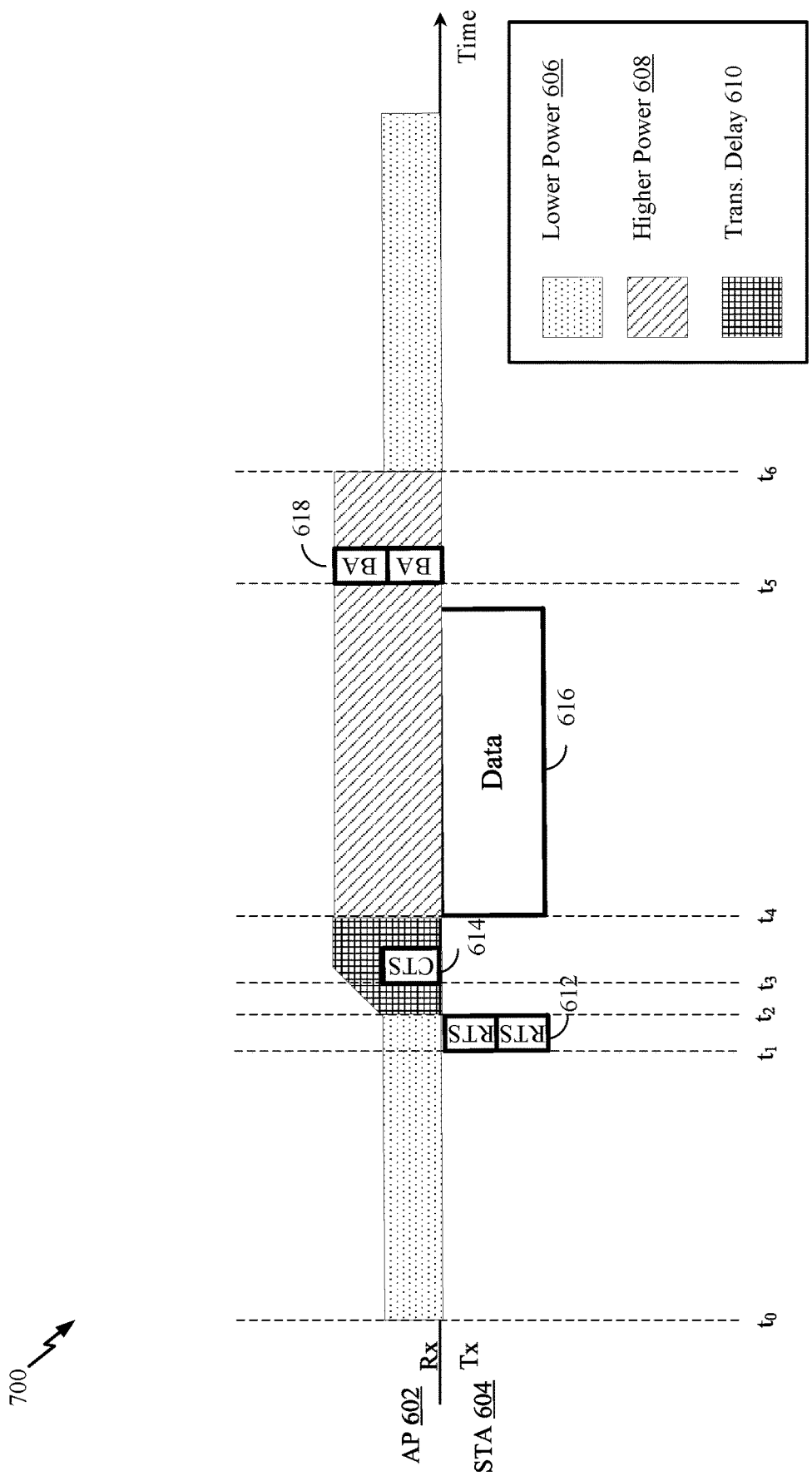
FIG. 7 shows a timing diagram depicting an example of wireless communication between a non-AP MLD and an AP MLD according to a power save protocol.

FIG. 7 shows a timing diagram depicting an example of wireless communication between a non-AP MLD and an AP MLD according to a power save protocol. In some implementations, the AP 602 may be one example of the AP 102 of FIG. 1, the AP 302 of FIG. 3A, APs 412, 414, and 416 of FIG. 4, or the AP 522, and 524 of FIG. 5. In some implementations, the STA 604 may be one example of any of the STAs 104 of FIG. 1, the STA 304 of FIG. 3B, the STA 422, 424, and 426 of FIG. 4, or STA 512, and 514 of FIG. 5.

Timing diagram 700 depicts details of a dynamic AP 602 PS mode when the AP 602 is operating in a lower power mode according to a second mode LS-RXTX. In contrast to the timing diagram 600 from FIG. 6, timing diagram 700 depicts the AP entering a lower power mode in a second mode which has more functionality (for example, a limited transmission functionality) as compared with the AP entering the lower power mode in the first mode which only has a RX functionality as depicted in FIG. 6. Accordingly, as well be explained below, in the second mode (for example, LS-RXTX), the AP 602 may transmit a response (for example, CTS frame 614) associated with a request (for example, RTS frame 612) during the transition delay time period 610.

At time period $t_0$, the AP 602 may be in a lower power mode 606. For instance, the AP 602 may operate in 20 MHz/1SS in the lower power mode 606. After time period $t_4$, the AP 602 may switch to a higher power mode 608 due to the reception of an MPDU that is individually addressed to the AP 602 carried in 20 MHz non-HT (dup) PPDU. In an aspect, additional limitations (for example, with a mandatory data rate) may help from a PS/complexity perspective. At time period $t_3$, the response frame 614 sent by the AP 602 may be 20 MHz only although bandwidth signaling may indicate a same bandwidth as the soliciting frame 612. After time period $t_4$, the AP 602 remains in a higher power mode 608 for the higher power SP, and then, at time period $t_6$, goes back to a lower power mode 606 after the end of the higher power SP.

In an aspect, if the STA 604 signals the existence of more data to the AP 602 during SP/TXOP, then the AP 602 might not need to go to the lower power mode 606 after the end of the TXOP/SP. This reduces the extra overhead due to frame exchanges (for example, RTS frame 612, CTS frame 614) for power mode transition, albeit with a slight increase in power consumption. Here, the AP 602 may need some extra transition delay 610 time when switching from the lower power mode 606 to the higher power mode 608.

The AP 602 may continue to be in a lower power mode 606 when sending the response 614 to the soliciting PPDU 612. The transition delay 610 (for example, the switch from the lower power mode 606 to the higher power mode 608) may be in the order of tens to hundreds of microseconds. In the first mode (for example, limited RX capability) mode, if a transition delay 610 is less than or equal to SIFS (for example, 16 microseconds) then the AP 602 may generate the CTS frame 614 in full bandwidth. Otherwise, in the second mode (for example, limited RX/TX capability) if the transition delay 610 is less than or equal to 2*SIFS+CTRL_RSP+L_PHY_DUR, then the AP 602 may generate the CTS frame 614 only in the primary 20 MHz. If the transition delay 610 is more than the 2*SIFS+CTRL_RSP+L_PHY_DUR, then padding may be utilized. The transition delay 610 assumes to begin at the end of RTS 612. However, some extra delay may be gained by starting the transition to higher power mode 608 after the RA field of the RTS frame 612.

Figure 8:
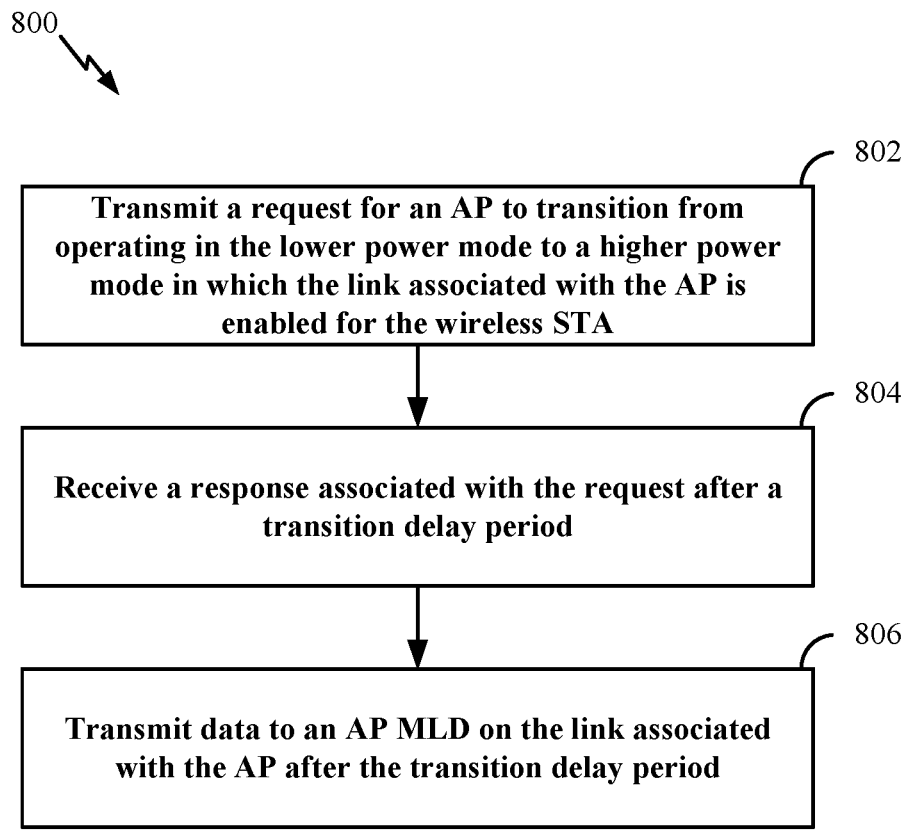
FIG. 8 shows a flow chart illustrating an example process performable by a non-AP MLD that supports wireless communication according to a power save protocol.

FIG. 8 shows a flow chart illustrating an example process performable by a non-AP MLD that supports wireless communication according to a power save protocol. In some implementations, the process 800 may be performed at a wireless STA, such as one of the STAs 104 of FIG. 1, the STA 304 of FIG. 3B, the STA 422, 424, and 426 of FIG. 4, STA 512, and 514 of FIG. 5, or the STA 604 described with reference to FIGS. 6 and 7. According to various different aspects, one or more of the illustrated blocks of process 800 may be omitted, transposed, or contemporaneously performed.

In some implementations, the process 800 begins in block 802 with transmitting, to an AP MLD having an AP operating in a lower power mode in which a link associated with the AP is disabled for the wireless STA, a request for the AP to transition from operating in the lower power mode to a higher power mode in which the link associated with the AP is enabled for the wireless STA.

In the context of FIG. 5, block 802 may be illustrated by the STA 512 transmitting a request to transition from a lower power mode to a higher power mode 521. In addition, in the context of FIGS. 6 and 7, block 802 may be illustrated by the STA 604 transmitting a RTS frame 612 to the AP 602.

In an aspect, the request for the AP to transition from operating in the lower power mode to operating in the higher power mode further includes a request to increase at least one of: a duration of time of a SP on the link associated with the AP when the link is enabled, a bandwidth on the link associated with the AP, or a NSS configured for the link associated with the AP. In an aspect, transmitting the request for the AP to transition from operating in the lower power mode to operating in the higher power mode in which a link associated with the AP is enabled for the wireless STA includes: transmitting the request on an anchor link associated with another AP of the AP MLD. The anchor link being enabled when the request is transmitted. In the context of FIG. 5, this aspect may be illustrated by the STA 512 transmitting a request on an anchor link associated with another AP of the AP MLD 525.

In an aspect, the AP is dozed on the link when the link is disabled, and the AP is active on the link when the link is enabled. In an aspect, at least one of a bandwidth available on the link, a NSS configured for the link, or a number of PPDUs on the link is reduced when the link is disabled relative to when the link is enabled.

In an aspect, the transition from operating in the lower power mode to operating in the higher power mode is based on the request for the AP to transition from operating in the lower power mode to operating in the higher power mode satisfying functionality constraints of the AP in the lower power mode, wherein the functionality constraints include at least one or more of: the request for the AP to transition from operating in the lower power mode to operating in the higher power mode being an individually addressed frame in a single spatial stream, the request for the AP to transition from operating in the lower power mode to operating in the higher power mode being received in a non-HT PPDU format, operating in a bandwidth of 20 MHz, mandatory MCSs, or the request for the AP to transition from operating in the lower power mode to operating in the higher power mode being a specific MAC frame. In an aspect, the request for the AP to transition from operating in the lower power mode to operating in the higher power mode indicates parameters for transmitting data in the higher power mode including at least one or more of: the bandwidth available on the link associated with the AP, a NSS configured for the link associated with the AP, supported data rates for the link associated with the AP, MCS for the link associated with the AP, or a duration of a PPDU for the link associated with the AP. In an aspect, the request for the AP to transition from operating in the lower power mode to operating in the higher power mode corresponds to a MAC MPDU individually addressed to the AP.

In an aspect, the lower power mode further includes a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode. In some aspects, the transition delay period is within a short inter frame space (SIFS) when the AP operates in the first mode. In some aspects, the transition delay period is more than a SIFS when the AP operates in the second mode.

The process 800 may include block 804 that includes receiving a response associated with the request after a transition delay period. In an aspect, the response associated with the request is received when the AP is still operating in the second mode. In an aspect, the response associated with the request includes at least one of: bandwidth signaling information for indicating at least one of a maximum bandwidth on the link associated with the AP, a maximum NSS configured for the link associated with the AP, or a MCS for exchanging frames with the AP when the AP operates in the second mode.

In the context of FIG. 5, block 804 may be illustrated by the STA 512 receiving a response associated with the request after a transition delay period 528. In the context of FIG. 6 and FIG. 7, block 804 may also be illustrated by the AP 602 transmitting a CTS 614 frame in response to receiving the RTS frames 612.

The process 800 may include block 806 that includes transmitting data to the AP MLD on the link associated with the AP after the transition delay period.

In the context of FIG. 5, block 806 may be illustrated by the STA 512 transmitting data to the AP MLD 520 when the link is enabled after the transition delay period 530. In the context of FIGS. 6 and 7, block 806 may also be illustrated by the STA 604 transmitting data 616 to the AP 602 when the AP 602 is in the higher power mode 608.

Figure 9:
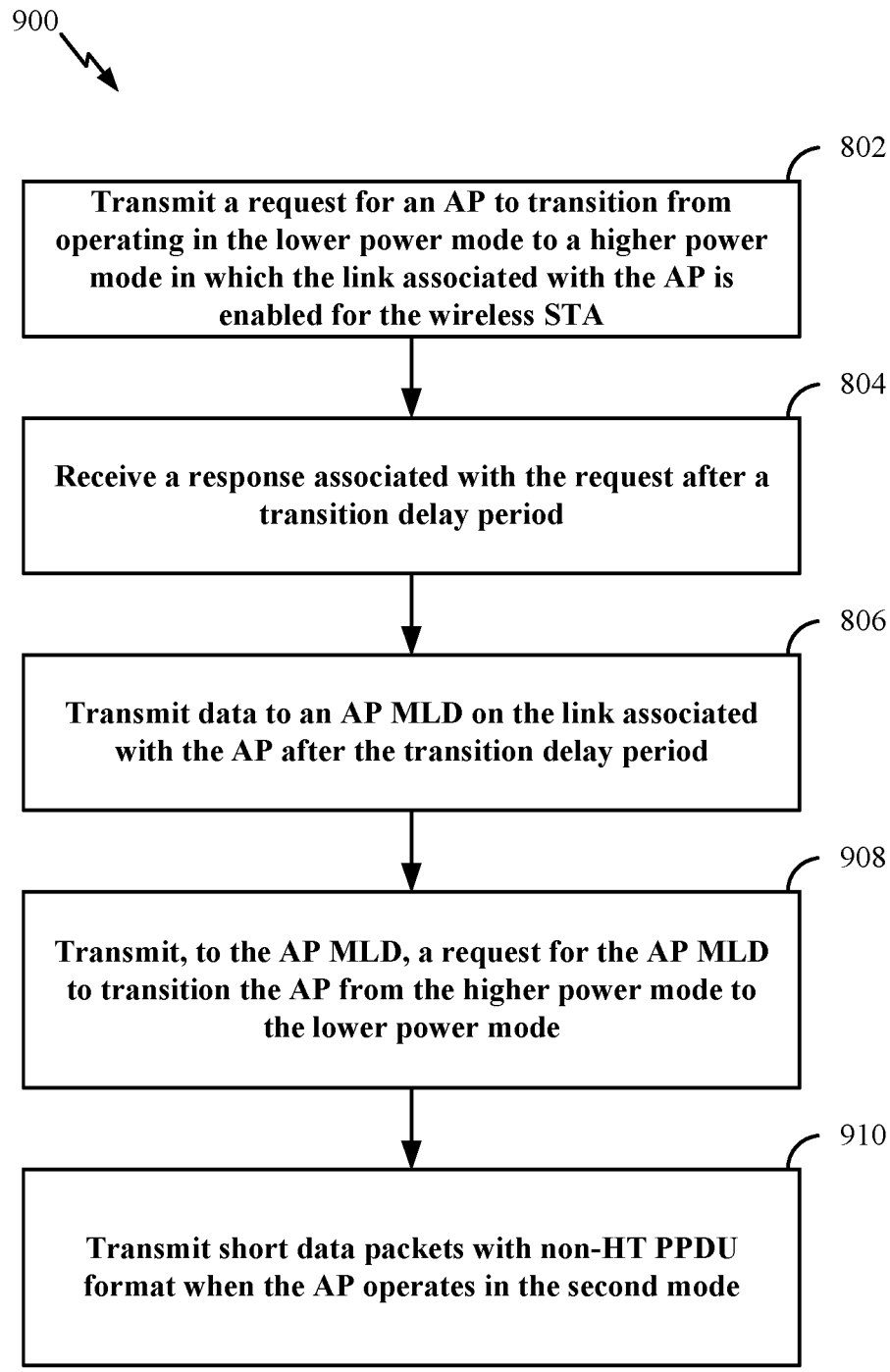
FIG. 9 shows a flow chart illustrating an example process performable by a non-AP MLD that supports wireless communication according to a power save protocol.

FIG. 9 shows a flow chart illustrating an example process performable by a non-AP MLD that supports wireless communication according to a power save protocol. In some implementations, the process 900 may be performed at a wireless STA, such as one of the STAs 104 of FIG. 1, the STA 304 of FIG. 3B, the STA 422, 424, and 426 of FIG. 4, STA 512, and 514 of FIG. 5, or the STA 604 described with reference to FIGS. 6 and 7. According to various different aspects, one or more of the illustrated blocks of process 900 may be omitted, transposed, or contemporaneously performed. In such process 900, blocks 802, 804, and 806 are performed as described above in connection to FIG. 8.

In an aspect, the process 900 may include block 908 that includes transmitting, to the AP MLD, a request for the AP MLD to transition the AP from the higher power mode to the lower power mode, the link being disabled when the AP is in the lower power mode.

In the context of FIG. 5, block 908 may be illustrated by the STA 612 transmitting a request for the AP MLD 520 to transition the AP 522 from the higher power mode to the lower power mode 534, In an aspect, the process 900 may include block 910 that includes transmitting short data packets with non-HT PPDU format when the AP operates in the second mode.

Figure 10:
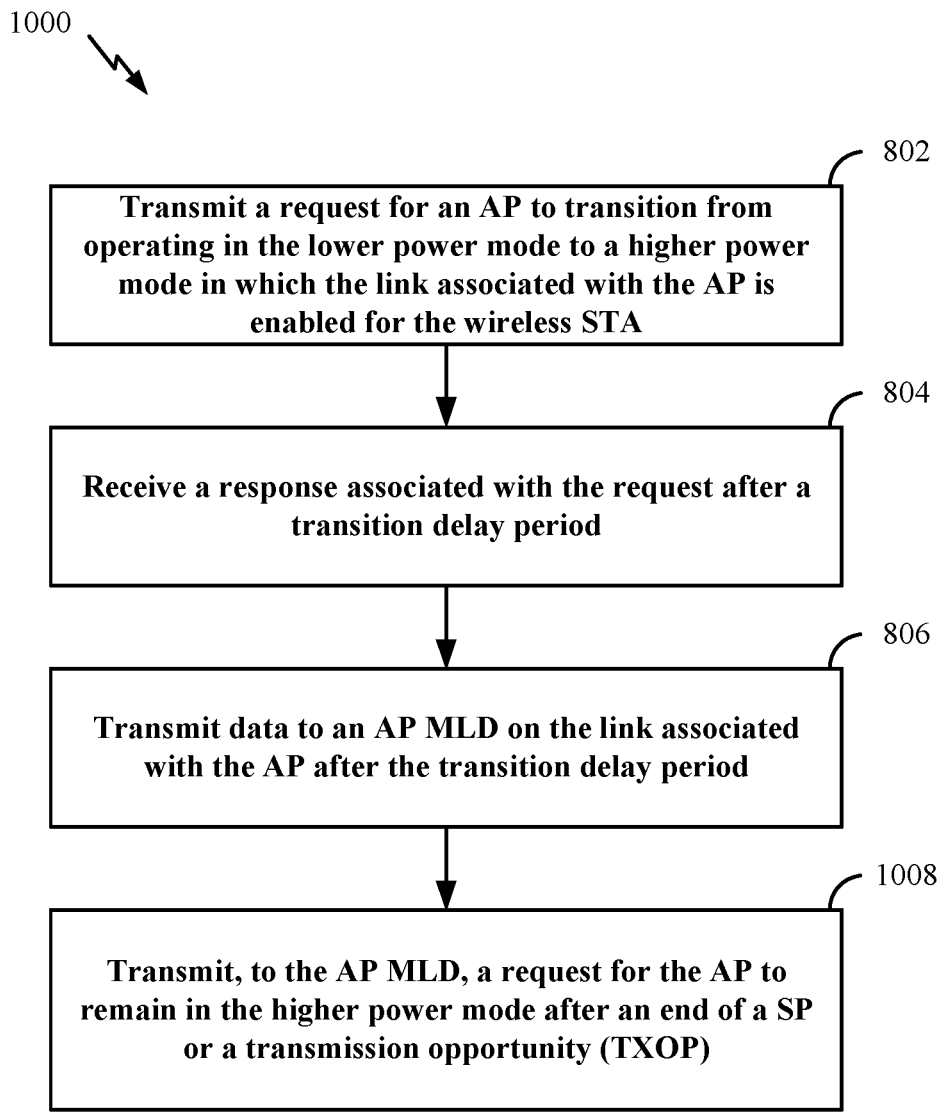
FIG. 10 shows a flow chart illustrating an example process performable by a non-AP MLD that supports wireless communication according to a power save protocol.

FIG. 10 shows a flow chart illustrating an example process performable by a non-AP MLD that supports wireless communication according to a power save protocol. In some implementations, the process 1000 may be performed at a wireless STA, such as one of the STAs 104 of FIG. 1, the STA 304 of FIG. 3B, the STA 422, 424, and 426 of FIG. 4, STA 512, and 514 of FIG. 5, or the STA 604 described with reference to FIGS. 6 and 7. According to various different aspects, one or more of the illustrated blocks of process 1000 may be omitted, transposed, or contemporaneously performed. In such process 1000, blocks 802, 804, and 806 are performed as described above in connection to FIG. 8.

In an aspect, the process 1000 may include block 1008 that includes transmitting, to the AP MLD, a request for the AP to remain in the higher power mode after an end of a SP or a TXOP. The request for the AP to stay in the higher power mode may indicate an existence of additional data to be transmitted during the SP or TXOP.

In the context of FIG. 5, block 1008 may be illustrated by the STA 512 transmitting a request for the AP 522 to remain in the higher power mode after an end of a SP or a TXOP 532.

Figure 11:
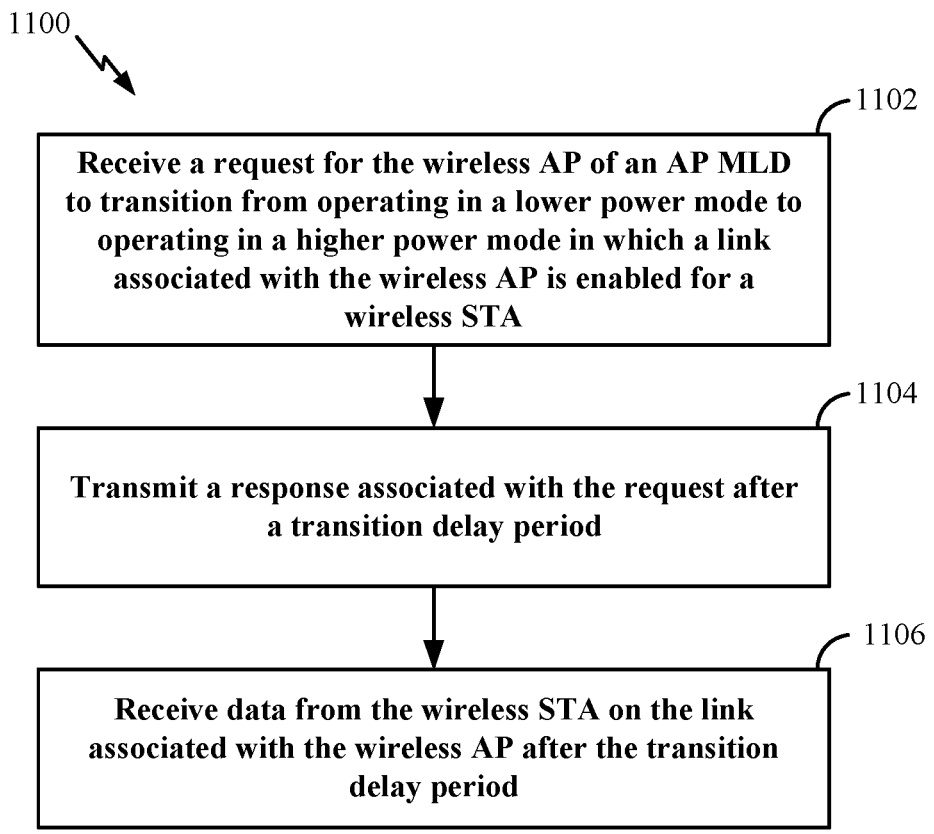
FIG. 11 shows a flow chart illustrating an example process performable by an AP MLD that supports wireless communication according to a power save protocol.

FIG. 11 shows a flow chart illustrating an example process performable by an AP MLD that supports wireless communication according to a power save protocol. In some implementations, the process 1100 may be performed at an AP, such as one of the AP 102 of FIG. 1, the AP 302 of FIG. 3A, APs 412, 414, and 416 of FIG. 4, the AP 522, and 524 of FIG. 5, or the AP 602 described with reference to FIGS. 6 and 7. According to various different aspects, one or more of the illustrated blocks of process 1100 may be omitted, transposed, or contemporaneously performed.

The process 1100 may include blocks 1102 that includes receiving, from a wireless station (STA), a request for a wireless AP of the AP MLD to transition from operating in a lower power mode, in which a link associated with the wireless AP is disabled for the wireless STA, to operating in a higher power mode in which the link associated with the wireless AP is enabled for the wireless STA.

In the context of FIG. 5, block 1102 may be illustrated by the STA 512 transmitting a request for the AP MLD 520 to transition the AP 522 from the higher power mode to the lower power mode 534. In the context of FIGS. 6 and 7, block 1102 may also be illustrated by the STA 604 transmitting RTS frames 612 to transition the AP 602 from the higher power mode to the lower power mode.

In an aspect, the request for the wireless AP to transition from operating in the lower power mode to operating in the higher power mode further includes a request to increase at least one of: a duration of time of a SP on the link associated with the wireless AP when the link is enabled, a bandwidth on the link associated with the wireless AP, or a NSS configured for the link associated with the wireless AP. In an aspect, receiving the request for the wireless AP to transition from operating in the lower power mode to operating in the higher power mode in which the link associated with the wireless AP is enabled for the wireless STA includes receiving the request on an anchor link associated with another AP of the AP MLD, the anchor link being enabled when the request is received.

In an aspect, the wireless AP is dozed on the link when the link is disabled, and the wireless AP is active on the link when the link is enabled. In an aspect, at least one of a bandwidth available on the link, a NSS configured for the link, or a number of PPDUs on the link is reduced when the link is disabled relative to when the link is enabled.

In an aspect, the transition from operating in the lower power mode to operating in the higher power mode is based on the request for the wireless AP to transition from operating in the lower power mode to operating in the higher power mode satisfying functionality constraints of the wireless AP in the lower power mode, wherein the functionality constraints include at least one or more of: the request for the wireless AP to transition from operating in the lower power mode to operating in the higher power mode being an individually addressed frame in a single spatial stream, the request for the wireless AP to transition from operating in the lower power mode to operating in the higher power mode being received in a non-HT PPDU format, operating in a bandwidth of 20 MHz, mandatory MCSs, or the request for the wireless AP to transition from operating in the lower power mode to operating in the higher power mode being a specific MAC frame.

In an aspect, the request for the wireless AP to transition from operating in the lower power mode to operating in the higher power mode indicates parameters for transmitting data in the higher power mode including at least one or more of: the bandwidth available on the link, a NSS configured for the link, supported data rates for the link, MCS for the link, or a duration of a PPDU for the link.

In an aspect, the request for the wireless AP to transition from operating in the lower power mode to operating in the higher power mode corresponds to a MAC MPDU individually addressed to the wireless AP.

The process 1100 may include blocks 1104 that includes transmitting a response associated with the request after a transition delay period.

In the context of FIG. 5, block 1104 may be illustrated by the STA 512 receiving a response associated with the request after a transition delay period 528. In the context of FIGS. 6 and 7, block 1104 may also be illustrated by the AP 602 transmitting a CTS frame 614 in response to receiving the RTS fames 512.

The process 1100 may include block 1106 that includes receiving data from the wireless STA on the link associated with the wireless AP when the link is enabled after the transition delay period.

In the context of FIG. 5, block 1106 may be illustrated by the STA 512 transmitting data to the AP MLD 520 after the transition delay period. In the context of FIGS. 6 and 7, block 1106 may also be illustrated by the STA 604 transmitting data 616 to the AP 602 when the AP 602 is in a higher power mode 608.

Figure 12:
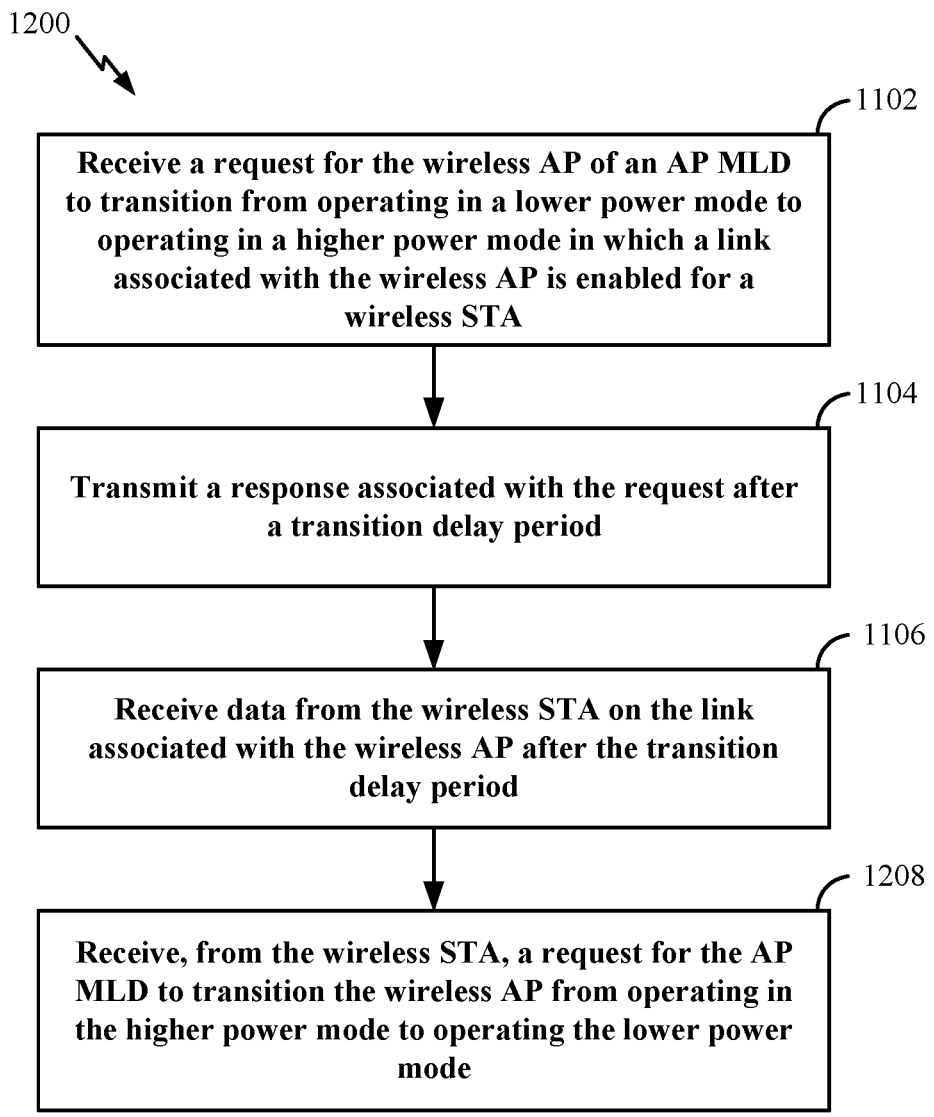
FIG. 12 shows a flow chart illustrating an example process performable by an AP MLD that supports wireless communication according to a power save protocol.

FIG. 12 shows a flow chart illustrating an example process performable by an AP MLD that supports wireless communication according to a power save protocol. In some implementations, the process 1100 may be performed at an AP, such as one of the AP 102 of FIG. 1, the AP 302 of FIG. 3A, APs 412, 414, and 416 of FIG. 4, the AP 522, and 524 of FIG. 5, or the AP 602 described with reference to FIGS. 6 and 7. According to various different aspects, one or more of the illustrated blocks of process 1200 may be omitted, transposed, or contemporaneously performed. In such process 1200, blocks 1102, 1104, and 1106 are performed as described above in connection to FIG. 11.

In an aspect, the process 1200 may include blocks 1208 that includes receiving, from the wireless STA, a request for the AP MLD to transition the wireless AP from operating in the higher power mode to operating in the lower power mode. The link being disabled when the wireless AP is in the lower power mode.

In the context of FIG. 5, block 1208 may be illustrated by the STA 512 transmitting a request for the AP MLD 520 to transition the AP 522 from the higher power mode to the lower power mode 534.

Figure 13:
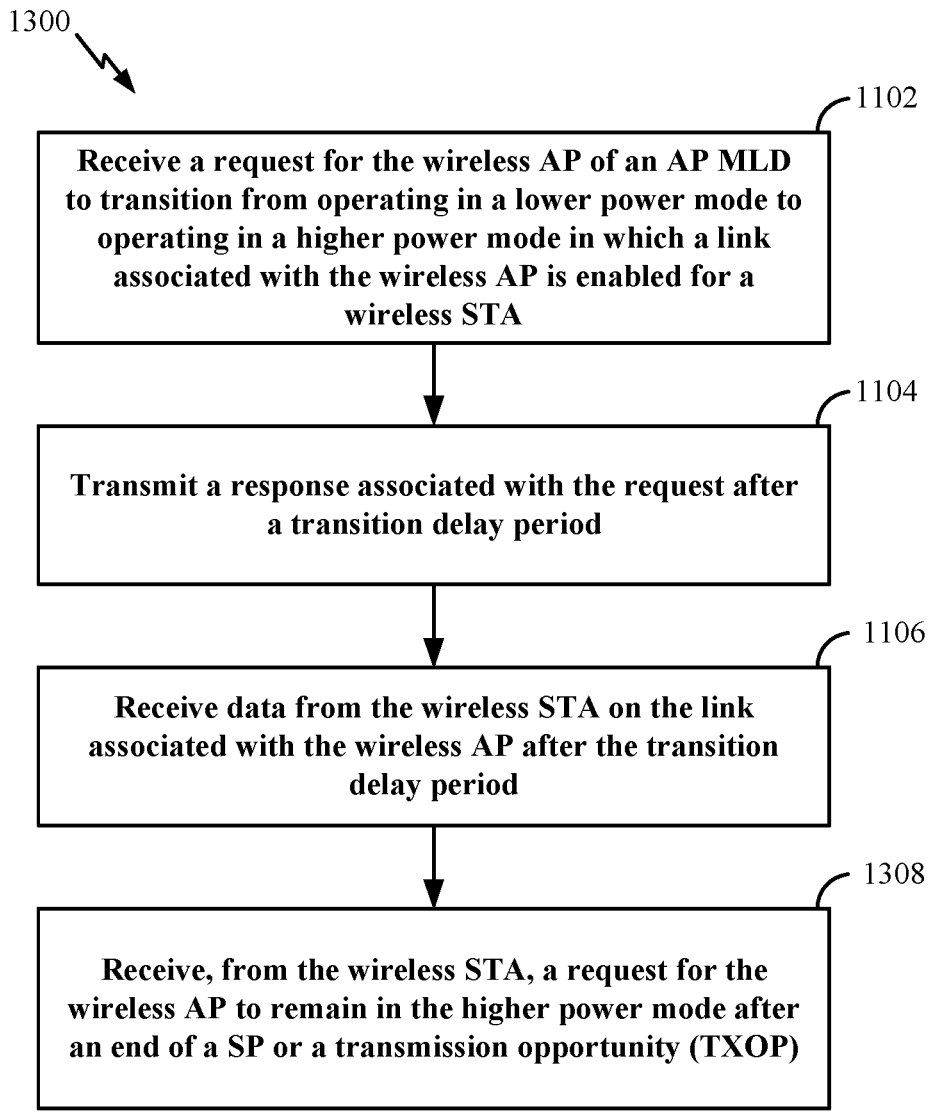
FIG. 13 shows a flow chart illustrating an example process performable by an AP MLD that supports wireless communication according to a power save protocol.

FIG. 13 shows a flow chart illustrating an example process performable by an AP MLD that supports wireless communication according to a power save protocol. In some implementations, the process 1300 may be performed at an AP, such as one of the AP 102 of FIG. 1, the AP 302 of FIG. 3A, APs 412, 414, and 416 of FIG. 4, the AP 522, and 524 of FIG. 5, or the AP 602 described with reference to FIGS. 6 and 7. According to various different aspects, one or more of the illustrated blocks of process 1300 may be omitted, transposed, or contemporaneously performed. In such process 1300, blocks 1102, 1104, and 1106 are performed as described above in connection to FIG. 11.

The process 1300 may include blocks 1308 that includes receiving, from the wireless STA, a request for the wireless AP to remain in the higher power mode after an end of a SP or a TXOP, wherein the request for the wireless AP to stay in the higher power mode indicates an existence of additional data to be transmitted during the SP or TXOP. In an aspect, the lower power mode further includes a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode.

In the context of FIG. 5, block 1308 may be illustrated by the STA 512 transmitting a request for the AP 522 to remain in the higher power mode after an end of a SP or a TXOP 532.

Figure 14:
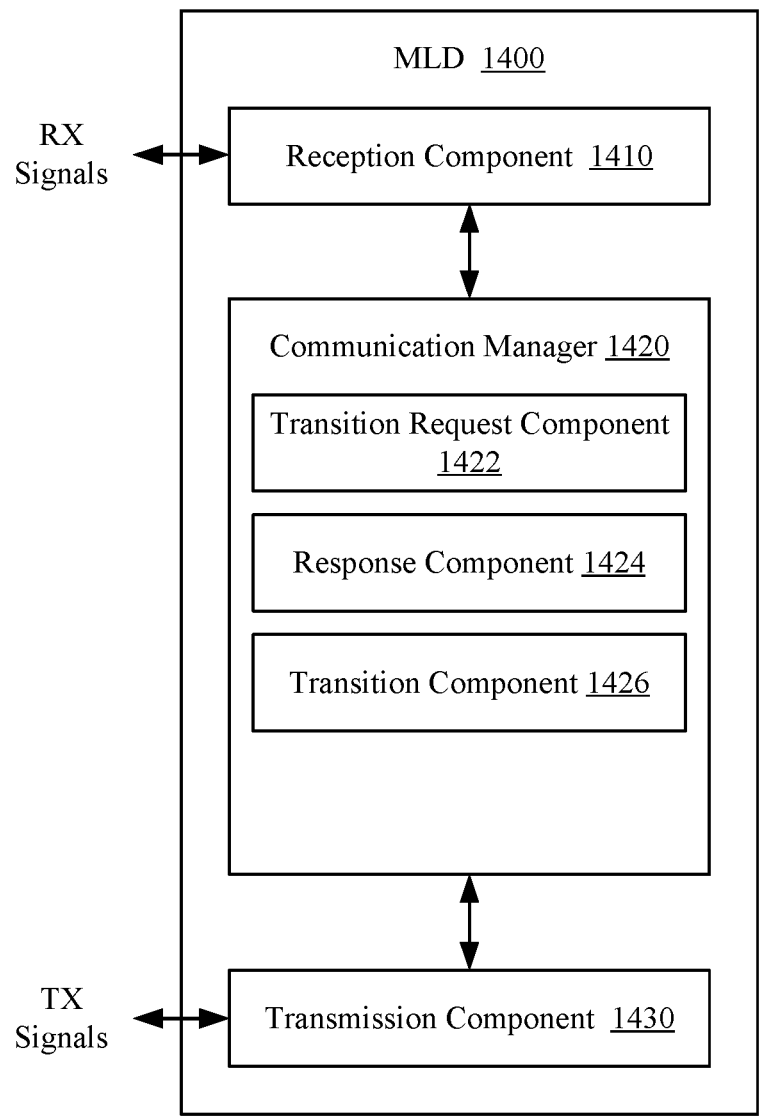
FIG. 14 shows a block diagram of an example MLD, according to some implementations.

FIG. 14 shows a block diagram of an example MLD 1400, according to some implementations. In some implementations, the MLD 1400 is configured to perform the process 1100 described above with reference to FIG. 11, process 1200 described above with reference to FIG. 12, and process 1300 described above with reference to FIG. 13. In some implementations, the MLD 1400 may be a chip, SoC, chipset, package, circuitry, device, or system that includes at least one processor and at least one modem, such as a Wi-Fi or IEEE 802.11-compliant modem or a cellular modem.

In some aspects, the MLD 1400 can be an example implementation of an AP or an AP MLD, such as the AP 102 described above with reference to FIG. 1, the AP 302 or WCD 310 described above with reference to FIG. 3A, the AP MLD 410 described above with reference to FIG. 4, one of the AP MLD 522, or 524 described above with reference to FIG. 5, or the AP 602 described with reference to FIGS. 6 and 7. In some other aspects, the MLD 1400 can be an example implementation of an STA or a non-AP MLD, such as one of the STAs 104 described above with reference to FIG. 1, the STA 304 or WCD 315 described above with reference to FIG. 3B, the non-AP MLD 420 described above with reference to FIG. 4, one of the non-AP MLD 510 described above with reference to FIG. 5, or the STA 604 described with reference to FIGS. 6 and 7.

The MLD 1400 includes a reception component 1410, a communication manager 1420, and a transmission component 1430. The communication manager 1420 further includes a transition request component 1422, a response component 1424, and a transition component 1426. In some aspects, portions of one or more of the components 1422, 1424, and 1426 may be implemented at least in part in hardware or firmware. In some implementations, at least one of the components 1422, 1424, or 1426 is implemented at least in part as software stored in a memory, such as the memory 208 of FIG. 2, the memory 340 of FIG. 3A, or the memory 345 of FIG. 3B. For example, portions of one or more of the components 1422, 1424, and 1426 may be implemented as instructions or computer-executable code (which may be stored on a non-transitory, computer-readable medium) executable by a processor (such as the processor 202 of FIG. 2, the application processor 330 of FIG. 3A, or the application processor 335 of FIG. 3B) to perform the functions or operations of the respective one of the component 1422, 1424, or 1426.

The reception component 1410 is configured to receive RX signals, over a wireless channel, from at least one of an AP, an STA, or an MLD (such as a non-AP MLD or an AP MLD). The transmission component 1430 is configured to transmit TX signals, over a wireless channel, to at least one of an AP, an STA, or an MLD (such as a non-AP MLD or an AP MLD). The communication manager 1420 is configured to control or manage communications with at least one of an AP, STA, or an MLD (such as a non-AP MLD or an AP MLD).

In some implementations, the transition request component 1422 may receive, from a STA, a request for the wireless AP to transition from a lower power mode to a higher power mode in which a link associated with the wireless AP is enabled for the wireless STA. The wireless AP being one of a subset of APs of an AP MLD operating in a lower power mode in which a link associated with the wireless AP is disabled for the wireless STA. The response component 1424 may transmit a response associated with the request after a transition delay period. The transition component 1426 receiving data from the wireless STA on the link associated with the wireless AP when the link is enabled after the transition delay period.

In some implementations, the transition request component 1422 may receive, from the wireless STA, a request for the AP MLD to transition the wireless AP from the higher power mode to the lower power mode, the link being disabled when the wireless AP is in the lower power mode. In some implementations, the transition request component 1422 may request to increase at least one of: a duration of time of a SP on the link associated with the wireless AP when the link is enabled, a bandwidth on the link associated with the wireless AP, or a NSS configured for the link associated with the wireless AP. In some implementations, the transition request component 1422 may receive the request on an anchor link associated with another AP of the AP MLD, the anchor link being enabled when the request is received. The wireless AP may be dozed on the link when the link is disabled, and the wireless AP may be active on the link when the link is enabled. At least one of a bandwidth available on the link, a NSS configured for the link, or a number of PPDUs on the link may be reduced when the link is disabled relative to when the link is enabled.

In some implementations, the transition component 1426 may determine whether the request for the wireless AP to transition from operating in the lower power mode to operating in the higher power mode satisfies functionality constraints of the wireless AP in the lower power mode. The functionality constraints may include at least one or more of: the request for the wireless AP to transition from operating in the lower power mode to operating in the higher power mode being an individually addressed frame in a single spatial stream, the request for the wireless AP to transition from operating in the lower power mode to operating in the higher power mode being received in a non-high-throughput (non-HT) PPDU format, operating in a bandwidth of 20 MHz, mandatory Modulation and Coding Schemes MCSs, or the request for the wireless AP to transition from operating in the lower power mode to operating in the higher power mode being a specific MAC frame. The request for the wireless AP to transition from operating in the lower power mode to operating in the higher power mode may indicate parameters for transmitting data in the higher power mode including at least one or more of: the bandwidth available on the link, a NSS configured for the link, supported data rates for the link, MCS for the link, or a duration of a PPDU for the link. The request for the wireless AP to transition from operating in the lower power mode to operating in the higher power mode may correspond to a MAC MPDU individually addressed to the wireless AP.

In some implementations, the transition request component 1422 may receive, from the wireless STA, a request for the wireless AP to remain in the higher power mode after an end of a SP or a TXOP, wherein the request for the wireless AP to stay in the higher power mode indicates an existence of additional data to be transmitted during the SP or TXOP. In some implementations, the lower power mode may further include a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode.

Some Additional Examples

The aspects described herein additionally include one or more of the following implementation examples described in the following numbered clauses.

1. A wireless communication device, comprising:
   at least one processor; and
   a memory coupled to the at least one processor storing code executable by the at least one processor to cause the wireless communication device to:
   transmit, to a wireless access point (AP) multi-link device (MLD) having an AP operating in a lower power mode in which a link associated with the AP is disabled for the wireless STA, a request for the AP to transition from operating in the lower power mode to operating in a higher power mode in which the link associated with the AP is enabled for the wireless STA;
   receive a response associated with the request after a transition delay period; and
   transmit data to the AP MLD on the link associated with the AP after the transition delay period.

2. The wireless communication device of claim 1, further comprising:
   transmitting, to the AP MLD, a request for the AP MLD to transition the AP from the higher power mode to the lower power mode, the link being disabled when the AP is in the lower power mode.

3. The wireless communication device of any preceding clause, wherein the request for the AP to transition from operating in the lower power mode to operating in the higher power mode further comprises a request to increase at least one of: a duration of time of a service period (SP) on the link associated with the AP when the link is enabled, a bandwidth on the link associated with the AP, or a number of spatial streams (NSS) configured for the link associated with the AP.

4. The wireless communication device of any preceding clause, wherein transmitting the request for the AP to transition from operating in the lower power mode to operating in the higher power mode in which a link associated with the AP is enabled for the wireless STA comprises:
  transmitting the request on an anchor link associated with another AP of the AP MLD, the anchor link being enabled when the request is transmitted.

5. The wireless communication device of any preceding clause, wherein the AP is dozed on the link when the link is disabled, and wherein the AP is active on the link when the link is enabled.

6. The wireless communication device of any preceding clause, wherein at least one of a bandwidth available on the link, a number of spatial streams (NSS) configured for the link, or a number of physical layer protocol data unit (PPDUs) on the link is reduced when the link is disabled relative to when the link is enabled.

7. The wireless communication device of any preceding clause, wherein the transition from operating in the lower power mode to operating in the higher power mode is based on the request for the AP to transition from operating in the lower power mode to operating in the higher power mode satisfying functionality constraints of the AP in the lower power mode, wherein the functionality constraints include at least one or more of: the request for the AP to transition from operating in the lower power mode to operating in the higher power mode being an individually addressed frame in a single spatial stream, the request for the AP to transition from operating in the lower power mode to operating in the higher power mode being received in a non-high-throughput (non-HT) PPDU format, operating in a bandwidth of 20 Megahertz (MHz), mandatory Modulation and Coding Schemes (MCSs), or the request for the AP to transition from operating in the lower power mode to operating in the higher power mode being a specific Medium Access Control (MAC) frame.

8. The wireless communication device of any preceding clause, wherein the request for the AP to transition from operating in the lower power mode to operating in the higher power mode indicates parameters for transmitting data in the higher power mode including at least one or more of: the bandwidth available on the link associated with the AP, a NSS configured for the link associated with the AP, supported data rates for the link associated with the AP, MCS for the link associated with the AP, or a duration of a PPDU for the link associated with the AP.

9. The wireless communication device of any preceding clause, wherein the request for the AP to transition from operating in the lower power mode to operating in the higher power mode corresponds to a media access control (MAC) protocol data unit (MPDU) individually addressed to the AP.

10. The wireless communication device of any preceding clause, wherein the lower power mode further includes a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode.

11. The wireless communication device of any preceding clause, wherein the transition delay period is within a short inter frame space (SIFS) when the AP operates in the first mode.

12. The wireless communication device of any preceding clause, wherein the transition delay period is more than a SIFS when the AP operates in the second mode.

13. The wireless communication device of any preceding clause, wherein the response associated with the request is received when the AP is still operating in the second mode.

14. The wireless communication device of any preceding clause, wherein the response associated with the request includes at least one of: bandwidth signaling information for indicating at least one of a maximum bandwidth on the link associated with the AP, a maximum NSS configured for the link associated with the AP, or a MCS for exchanging frames with the AP when the AP operates in the second mode.

15. The wireless communication device of any preceding clause, further comprising:
  transmitting short data packets with non-HT PPDU format when the AP operates in the second mode.

16. The wireless communication device of any preceding clause, further comprising:
  transmitting, to the AP MLD, a request for the AP to remain in the higher power mode after an end of a SP or a transmission opportunity (TXOP), wherein the request for the AP to stay in the higher power mode indicates an existence of additional data to be transmitted during the SP or TXOP.

17. A method of wireless communication at a wireless station (STA), comprising:
  transmitting, to an access point (AP) multi-link device (MLD) having an AP operating in a lower power mode in which a link associated with the AP is disabled for the wireless communication device, a request for the AP to transition from the lower power mode to a higher power mode in which the link associated with the AP is enabled for the wireless communication device,
  receiving a response associated with the request after a transition delay period, and
  transmitting data to the AP MLD on the link associated with the AP when the link is enabled after the transition delay period.

18. The method of claim 17, wherein the request for the AP to transition from operating in the lower power mode to operating in the higher power mode further comprises a request to increase at least one of: a duration of time of a service period (SP) on the link associated with the AP when the link is enabled, a bandwidth on the link associated with the AP, or a number of spatial streams (NSS) configured for the link associated with the AP.

19. A wireless access point (AP), comprising:
  at least one processor; and
  a memory coupled to the at least one processor storing code executable by the at least one processor to cause the wireless AP to:
  receive, from a wireless station (STA), a request for the wireless AP to transition from a lower power mode to a higher power mode in which a link associated with the wireless AP is enabled for the wireless STA, the wireless AP being one of a subset of APs of an AP multi-link device (MLD) operating in a lower power mode in which a link associated with the wireless AP is disabled for the wireless STA;

transmit a response associated with the request after a transition delay period; and
receive data from the wireless STA on the link associated with the wireless AP when the link is enabled after the transition delay period.

20. The method of claim 19, wherein the memory coupled to the at least one processor storing code executable by the at least one processor further causes the wireless AP to:
receive, from the wireless STA, a request for the AP MLD to transition the wireless AP from the higher power mode to the lower power mode, the link being disabled when the wireless AP is in the lower power mode 21. The wireless AP of claim 19 or 20, wherein the request for the wireless AP to transition from operating in the lower power mode to operating in the higher power mode further comprises a request to increase at least one of: a duration of time of a service period (SP) on the link associated with the wireless AP when the link is enabled, a bandwidth on the link associated with the wireless AP, or a number of spatial streams (NSS) configured for the link associated with the wireless AP.

22. The wireless AP of any preceding clause, wherein receiving the request for the wireless AP to transition from operating in the lower power mode to operating in the higher power mode in which the link associated with the wireless AP is enabled for the wireless STA comprises:
receiving the request on an anchor link associated with another AP of the AP MLD, the anchor link being enabled when the request is received.

23. The wireless AP of any preceding clause, wherein the wireless AP is dozed on the link when the link is disabled, and wherein the wireless AP is active on the link when the link is enabled.

24. The wireless AP of any preceding clause, wherein at least one of a bandwidth available on the link, a number of spatial streams (NSS) configured for the link, or a number of physical layer protocol data unit (PPDUs) on the link is reduced when the link is disabled relative to when the link is enabled.

25. The wireless AP of any preceding clause, wherein the transition from operating in the lower power mode to operating in the higher power mode is based on the request for the wireless AP to transition from operating in the lower power mode to operating in the higher power mode satisfying functionality constraints of the wireless AP in the lower power mode, wherein the functionality constraints include at least one or more of: the request for the wireless AP to transition from operating in the lower power mode to operating in the higher power mode being an individually addressed frame in a single spatial stream, the request for the wireless AP to transition from operating in the lower power mode to operating in the higher power mode being received in a non-high-throughput (non-HT) PPDU format, operating in a bandwidth of 20 Megahertz (MHz), mandatory Modulation and Coding Schemes (MCSs), or the request for the wireless AP to transition from operating in the lower power mode to operating in the higher power mode being a specific Medium Access Control (MAC) frame.

26. The wireless AP of any preceding clause, wherein the request for the wireless AP to transition from operating in the lower power mode to operating in the higher power mode indicates parameters for transmitting data in the higher power mode including at least one or more of: the bandwidth available on the link, a NSS configured for the link, supported data rates for the link, MCS for the link, or a duration of a PPDU for the link.

27. The wireless AP of any preceding clause, wherein the request for the wireless AP to transition from operating in the lower power mode to operating in the higher power mode corresponds to a media access control (MAC) protocol data unit (MPDU) individually addressed to the wireless AP.

28. The wireless AP of any preceding clause, further comprising:
receiving, from the wireless STA, a request for the wireless AP to remain in the higher power mode after an end of a SP or a transmission opportunity (TXOP), wherein the request for the wireless AP to stay in the higher power mode indicates an existence of additional data to be transmitted during the SP or TXOP.

29. The wireless AP of any preceding clause, wherein the lower power mode further includes a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode.

30. A method for wireless communication at a wireless access point (AP), the method comprising:
receiving, from a wireless station (STA), a request for a wireless AP of the AP MLD to transition from operating in a lower power mode, in which a link associated with the wireless AP is disabled for the wireless STA, to operating in a higher power mode in which the link associated with the wireless AP is enabled for the wireless STA;
transmitting a response associated with the request after a transition delay period; and
receiving data from the wireless STA on the link associated with the wireless AP when the link is enabled after the transition delay period.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, various features that are described in this specification in the context of separate aspects also can be implemented in combination in a single aspect. Conversely, various features that are described in the context of a single aspect also can be implemented in multiple aspects separately or in any suitable sub combination. As such, although features may be described above as acting in particular combinations, and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. A wireless communication device, comprising:
   at least one memory; and
   at least one processor communicatively coupled with the at least one memory, the at least one processor operable to cause the wireless communication device to:
      transmit, to a wireless access point (AP) multi-link device (MLD) having an AP operating in a lower power mode in which a link associated with the AP is disabled for a wireless station (STA), a request for the AP to transition from operating in the lower power mode to operating in a higher power mode in which the link associated with the AP is enabled for the wireless STA;
      receive a response associated with the request after a transition delay period; and
      transmit data to the AP MLD on the link associated with the AP after the transition delay period.

2. The wireless communication device of claim 1, wherein the at least one processor is operable to further cause the wireless communication device to:
   transmit, to the AP MLD, a request for the AP MLD to transition the AP from operating in the higher power mode to operating in the lower power mode, the link being disabled when the AP is in the lower power mode.

3. The wireless communication device of claim 1, wherein the request for the AP to transition from operating in the lower power mode to operating in the higher power mode further comprises a request to increase at least one of: a duration of time of a service period (SP) on the link associated with the AP when the link is enabled, a bandwidth on the link associated with the AP, or a number of spatial streams (NSS) configured for the link associated with the AP.

4. The wireless communication device of claim 1, wherein transmitting the request for the AP to transition from operating in the lower power mode to operating in the higher power mode in which a link associated with the AP is enabled for the wireless STA comprises:
   transmitting the request on an anchor link associated with another AP of the AP MLD, the anchor link being enabled when the request is transmitted.

5. The wireless communication device of claim 1, wherein the AP is dozed on the link when the link is disabled, and wherein the AP is active on the link when the link is enabled.

6. The wireless communication device of claim 1, wherein at least one of a bandwidth available on the link, a number of spatial streams (NSS) configured for the link, or a number of physical layer protocol data unit (PPDUs) on the link is reduced when the link is disabled relative to when the link is enabled.

7. The wireless communication device of claim 1, wherein the transition from operating in the lower power mode to operating in the higher power mode is based on the request for the AP to transition from operating in the lower power mode to operating in the higher power mode satisfying functionality constraints of the AP in the lower power mode, wherein the functionality constraints include at least one or more of: the request for the AP to transition from operating in the lower power mode to operating in the higher power mode being an individually addressed frame in a single spatial stream, the request for the AP to transition from operating in the lower power mode to operating in the higher power mode being received in a non-high-throughput (non-HT) PPDU format, operating in a bandwidth of 20 Megahertz (MHz), mandatory Modulation and Coding Schemes (MCSs), or the request for the AP to transition from operating in the lower power mode to operating in the higher power mode being a specific Medium Access Control (MAC) frame.

8. The wireless communication device of claim 7, wherein the request for the AP to transition from operating in the lower power mode to operating in the higher power mode indicates parameters for transmitting data in the higher power mode including at least one or more of: the bandwidth available on the link associated with the AP, a NSS configured for the link associated with the AP, supported data rates for the link associated with the AP, MCS for the link associated with the AP, or a duration of a PPDU for the link associated with the AP.

9. The wireless communication device of claim 7, wherein the request for the AP to transition from operating in the lower power mode to operating in the higher power mode corresponds to a media access control (MAC) protocol data unit (MPDU) individually addressed to the AP.

10. The wireless communication device of claim 7, wherein the lower power mode includes:
   a first mode in which the AP operates in a reduced receiving functionality, relative to the AP operating in a normal operating mode, and with no transmission functionality; and
   a second mode in which the AP operates in a reduced receiving and transmission functionality relative to the AP operating in the normal operating mode.

11. The wireless communication device of claim 10, wherein the transition delay period is within a short inter frame space (SIFS) when the AP operates in the first mode.

12. The wireless communication device of claim 10, wherein the transition delay period is more than a SIFS when the AP operates in the second mode.

13. The wireless communication device of claim 10, wherein the response associated with the request is received when the AP is still operating in the second mode.

14. The wireless communication device of claim 10, wherein the response associated with the request includes at least one of: bandwidth signaling information for indicating at least one of a maximum bandwidth on the link associated with the AP, a maximum NSS configured for the link associated with the AP, or a MCS for exchanging frames with the AP when the AP operates in the second mode.

15. The wireless communication device of claim 10, wherein the at least one processor is operable to further cause the wireless communication device to:
transmit short data packets with non-HT PPDU format when the AP operates in the second mode.

16. The wireless communication device of claim 1, wherein the at least one processor is operable to further cause the wireless communication device to:
transmit, to the AP MLD, a request for the AP to remain operating in the higher power mode after an end of a SP or a transmission opportunity (TXOP), wherein the request for the AP to remain operating in the higher power mode indicates an existence of additional data to be transmitted during the SP or TXOP.

17. A method of wireless communication performable at a wireless station (STA), comprising:
transmitting, to a wireless access point (AP) multi-link device (MLD) having an AP operating in a lower power mode in which a link associated with the AP is disabled for the wireless STA, a request for the AP to transition from operating in the lower power mode to operating in a higher power mode in which the link associated with the AP is enabled for the wireless STA;
receiving a response associated with the request after a transition delay period; and
transmitting data to the AP MLD on the link associated with the AP after the transition delay period.

18. The method of claim 17, wherein the request for the AP to transition from operating in the lower power mode to operating in the higher power mode further comprises a request to increase at least one of: a duration of time of a service period (SP) on the link associated with the AP when the link is enabled, a bandwidth on the link associated with the AP, or a number of spatial streams (NSS) configured for the link associated with the AP.

19. A wireless access point (AP), comprising:
at least one memory; and
at least one processor communicatively coupled with the at least one memory, the at least one processor operable to cause the wireless AP to:
receive, from a wireless station (STA), a request for a wireless AP of an access point (AP) multi-link device (MLD) to transition from operating in a lower power mode, in which a link associated with the wireless AP is disabled for the wireless STA, to operating in a higher power mode in which the link associated with the wireless AP is enabled for the wireless STA;
transmit a response associated with the request after a transition delay period; and
receive data from the wireless STA on the link associated with the wireless AP when the link is enabled after the transition delay period.

20. The wireless AP of claim 19, wherein the at least one processor is operable to further cause the wireless AP to:
receive, from the wireless STA, a request for the AP MLD to transition the wireless AP from operating in the higher power mode to operating in the lower power mode, the link being disabled when the wireless AP is in the lower power mode.

21. The wireless AP of claim 19, wherein the request for the wireless AP to transition from operating in the lower power mode to operating in the higher power mode further comprises a request to increase at least one of: a duration of time of a service period (SP) on the link associated with the wireless AP when the link is enabled, a bandwidth on the link associated with the wireless AP, or a number of spatial streams (NSS) configured for the link associated with the wireless AP.

22. The wireless AP of claim 19, wherein receiving the request for the wireless AP to transition from operating in the lower power mode to operating in the higher power mode in which the link associated with the wireless AP is enabled for the wireless STA comprises:
receiving the request on an anchor link associated with another AP of the AP MLD, the anchor link being enabled when the request is received.

23. The wireless AP of claim 19, wherein the wireless AP is dozed on the link when the link is disabled, and wherein the wireless AP is active on the link when the link is enabled.

24. The wireless AP of claim 19, wherein at least one of a bandwidth available on the link, a number of spatial streams (NSS) configured for the link, or a number of physical layer protocol data unit (PPDUs) on the link is reduced when the link is disabled relative to when the link is enabled.

25. The wireless AP of claim 19, wherein the transition from operating in the lower power mode to operating in the higher power mode is based on the request for the wireless AP to transition from operating in the lower power mode to operating in the higher power mode satisfying functionality constraints of the wireless AP in the lower power mode, wherein the functionality constraints include at least one or more of: the request for the wireless AP to transition from operating in the lower power mode to operating in the higher power mode being an individually addressed frame in a single spatial stream, the request for the wireless AP to transition from operating in the lower power mode to operating in the higher power mode being received in a non-high-throughput (non-HT) PPDU format, operating in a bandwidth of 20 Megahertz (MHz), mandatory Modulation and Coding Schemes (MCSs), or the request for the wireless AP to transition from operating in the lower power mode to operating in the higher power mode being a specific Medium Access Control (MAC) frame.

26. The wireless AP of claim 25, wherein the request for the wireless AP to transition from operating in the lower power mode to operating in the higher power mode indicates parameters for transmitting data in the higher power mode including at least one or more of: the bandwidth available on the link, a NSS configured for the link, supported data rates for the link, MCS for the link, or a duration of a PPDU for the link.

27. The wireless AP of claim 25, wherein the request for the wireless AP to transition from operating in the lower power mode to operating in the higher power mode corresponds to a media access control (MAC) protocol data unit (MPDU) individually addressed to the wireless AP.

28. The wireless AP of claim 25, wherein the at least one processor is operable to further cause the wireless AP to:
receive, from the wireless STA, a request for the wireless AP to remain operating in the higher power mode after an end of a SP or a transmission opportunity (TXOP), wherein the request for the wireless AP to remain operating in the higher power mode indicates an existence of additional data to be transmitted during the SP or TXOP.

29. The wireless AP of claim 25, wherein the lower power mode further includes a first mode in which the AP operates in a reduced receiving functionality relative to the AP operating in a normal operating mode and with no transmission functionality, and a second mode in which the AP operates in a reduced receiving and transmission functionality relative to the AP operating in the normal operating mode.

30. A method for wireless communication performable at a wireless access point (AP), the method comprising:
- receiving, from a wireless station (STA), a request for a wireless AP of an access point (AP) multi-link device (MLD) to transition from operating in a lower power mode, in which a link associated with the wireless AP is disabled for the wireless STA, to operating in a higher power mode in which the link associated with the wireless AP is enabled for the wireless STA;
- transmitting a response associated with the request after a transition delay period; and
- receiving data from the wireless STA on the link associated with the wireless AP when the link is enabled after the transition delay period.

* * * * *